United States Patent
Kado et al.

(10) Patent No.: US 6,674,726 B1
(45) Date of Patent: Jan. 6, 2004

(54) PROCESSING RATE MONITORING APPARATUS

(75) Inventors: Youiti Kado, Tokyo (JP); Ryohei Konuma, Tokyo (JP); Makiko Kaji, Tokyo (JP)

(73) Assignee: Oki Electric Industry Co, Ltd., Tokyo (JP)

( * ) Notice: Subject to any disclaimer, the term of this patent is extended or adjusted under 35 U.S.C. 154(b) by 0 days.

(21) Appl. No.: 09/256,355

(22) Filed: Feb. 24, 1999

(30) Foreign Application Priority Data

Feb. 27, 1998 (JP) .................................... 10-047184

(51) Int. Cl.$^7$ ............................................. G01R 31/08
(52) U.S. Cl. .................... 370/253; 370/230; 370/235; 370/395.1
(58) Field of Search ................................ 370/229, 230, 370/230.1, 231, 233, 234, 235, 252, 253, 412, 395.1, 389

(56) References Cited

U.S. PATENT DOCUMENTS

| | | | | |
|---|---|---|---|---|
| 5,432,713 A | * | 7/1995 | Takeo et al. | 707/505 |
| 5,726,987 A | * | 3/1998 | Uriu et al. | 370/395.72 |
| 5,835,484 A | * | 11/1998 | Yamato et al. | 370/230 |
| 6,094,418 A | * | 7/2000 | Soumiya et al. | 370/231 |
| 6,298,042 B1 | * | 10/2001 | Murase et al. | 370/235 |

OTHER PUBLICATIONS

"Gigabit Networking", Craig Partridge; 1961, Addison–Wesley Publishing Company, Inc., Group; ISBN 0–201–56333–9; U.S.A.; pp. 260–263.

* cited by examiner

*Primary Examiner*—Douglas Olms
*Assistant Examiner*—Bob A. Phunkulh
(74) *Attorney, Agent, or Firm*—Rabin & Berdo, P.C.

(57) ABSTRACT

A processing rate monitoring apparatus includes an appearance interval counter for counting a packet interval in a monitored connection at a real number level, and a determining arrangement, operable each time a packet corresponding to a monitored connection is detected, to compare a count value on the appearance interval counter indicating a time elapsed from the previous detection to the detection of the packet with an allowed value for an appearance interval calculated from a transmission rate of the monitored connection to determine the presence or absence of a transmission rate violation in a current monitoring cycle.

16 Claims, 27 Drawing Sheets

PROCESSING RATE MONITORING APPARATUS

BACKGROUND OF THE INVENTION

1. Field of the Invention

The present invention relates to a processing rate monitoring apparatus which can be applied to a cell rate monitoring apparatus positioned on an ATM network (Asynchronous Transfer Mode network) to monitor a cell transfer rate for each connection.

2. Description of Related Art

Conventionally, in an approach employed for a cell rate monitoring means of the type related to the present invention, located on a transmission path, a counter is provided for each connection to check whether or not a cell passing through the connection violates a rate in each counter by updating the counter every cell transfer cycle.

Monitoring methods applicable to such cell rate monitoring means may be classified into two: (a) a method of measuring an interval between two arbitrary consecutive cells within cells transferred for the same connection; and (b) a method of measuring the number of cells transferred within a fixed time period for the same connection. Generally, any cell rate monitoring means relies on one or both of these methods.

However, since the conventional methods as mentioned above manage a cell transfer rate as an integer, when the cell transfer rate is extended to a cell interval or the number of cells, a problem on monitoring accuracy may inevitably arise in some cell rates to be monitored.

Particularly, when delay variations are taken into account, a tolerance should be increased by a varying portion for each of monitored cycles, so that the throughput cannot be monitored over a plurality of cycles without appropriate measures.

In addition, in an attempt to realize a monitoring apparatus which is capable of individually and dynamically setting a cell rate for each of a plurality of connections and allowing the setting within a band which continuously exists exponentially from a small value to a large value, the conventional methods as mentioned above would have to simultaneously perform a plurality of complicated monitoring processing, which are not taken into account in the conventional methods. Thus, it appears to be difficult to realize such a monitoring apparatus with the conventional methods.

OBJECT AND SUMMARY OF THE INVENTION

The present invention has been made in view of the problem mentioned above, and is intended to propose a processing rate monitoring apparatus which is capable of more accurately monitoring a processing rate as compared with the prior art, and readily accommodating even an environment where a monitoring band extends over a wide range and a large number of objects are to be monitored.

To solve the problem mentioned above, a processing rate monitoring apparatus according to a first aspect of the present invention comprises (1) an appearance interval counter for counting a packet interval in a monitored connection at a real number level, and (2) determining means, operable each time a packet corresponding to a monitored connection is detected, to compare a count value on the appearance interval counter indicating a time elapsed from the previous detection to the detection of the packet, with an allowed value for an appearance interval calculated from a transmission rate of the monitored connection to determine the presence or absence of transmission rate violation in a current monitoring cycle.

As a consequence, a processing rate provided on the basis of a transmission rate is reflected to the count value of the appearance interval counter even to a real number value (a value including a decimal fraction), so that a round error of a count value, which has been possibly introduced in the past upon updating the count value, is reduced even if any value is required as a transmission rate for a monitored connection.

According to a second aspect of the present invention, a processing rate monitoring apparatus comprises (a) an appearance number counter for counting the number of packets appearing within a monitoring period at a real number level for a monitored connection, and (2) determining means, operable each time the lapse of the monitoring period is notified, to compare a count value of the appearance number counter indicating the number of packets newly counted within a current monitoring period with an allowed value for the number of appearing packets, calculated from a transmission rate of the monitored connection, to determine the presence or absence of transmission rate violation in the current monitoring period.

As a consequence, a processing rate provided on the basis of a transmission rate is reflected to the count value of the appearance number counter even to a real number value (a value including a decimal fraction), so that a round error of a count value, which has been possibly introduced in the past upon updating the count value, is reduced even if any value is required as a transmission rate for a monitored connection.

According to a third aspect of the present invention, a processing rate monitoring apparatus comprises (1) an appearance number counter for counting the number of packets appearing within a monitoring period at a real number level for a monitored connection, and (2) determining means, operable each time the lapse of the monitoring period is notified, to compare a count value of the appearance number counter indicating the number of packets newly counted within a current monitoring period with a delay variation allowed value to determine the presence or absence of transmission rate violation in the current monitoring period, wherein the delay variation allowed value is derived by adding delay variations to an allowed value for the number of appearing packets, and the allowed value is calculated from a transmission rate of the monitored connection.

As a consequence, the influence of delay variations occurring during the previous packet detection can be reflected to the count value of the appearance number counter, to which the processing rate is reflected to a real number level (a value including a decimal fraction), within the limits of delay variation allowed value. Thus, as long as a delay portion lies below the allowed value, the transmission rate can be monitored over a longer span.

According to a fourth aspect of the present invention, a processing rate monitoring apparatus comprises (1) event detecting means for notifying a monitored stream corresponding to an event appearing on a transmission path every transfer cycle, (2) a plurality of appearance interval counters each disposed for counting an event interval for a corresponding monitored stream, (3) a plurality of update timing generating means each corresponded to one or a plurality of the appearance interval counters for supplying an update timing signal each generated at different periods to the appearance interval counter placed in a corresponding relationship therewith, and (4) determining means, operable each time a monitored stream corresponding to a detected event is notified thereto from the event detecting means, to access an appearance interval counter corresponding to the monitored stream notified thereto, and to compare a count value of the appearance interval counter indicating a time elapsed from the previous detection to the detection of the event with an allowed value for an appearance interval calculated in consideration of an output period of the update timing and a processing rate of the monitored stream to determine the presence or absence of processing rate violation in a current monitoring cycle.

As a consequence, the updating of the appearance interval counter, which would have to be performed on an every transfer cycle basis, may be performed less frequently, i.e., at intervals several times longer than the transfer cycle (depending on an update period of the update timing generating means), when a required transfer rate is low, while the processing remains unchanged when a required processing rate is high. It is therefore possible to multiplex the monitoring processing for a large number of streams while maintaining a monitoring accuracy in accordance with a processing rate of interest.

According to a fifth aspect of the present invention, a processing rate monitoring apparatus comprises (1) event detecting means for notifying a monitored stream corresponding to an event appearing on a transmission path every transfer cycle, (2) a plurality of appearance number counters each disposed for counting the number of events appearing within a monitoring period for a corresponding monitored stream, (3) a plurality of time counters each disposed for measuring a monitoring period for a corresponding monitored stream, where each of the time counters is responsive to each corresponding update timing signal input thereto to increment a count value, (4) a plurality of update timing generating means each corresponded to one or a plurality of the time counters for supplying an update timing signal each generated at different periods to a time counter placed in a corresponding relationship therewith, and (5) determining means, operable each time the lapse of a monitoring period is notified thereto from a corresponding time counter, to compare a count value of an appearance number counter indicating the number of newly counted packets within a current monitoring period with an allowed value for the number of appearing events calculated in consideration of an output period of the update timing and a processing rate of a monitored stream to determine the presence or absence of processing rate violation in the current monitoring period.

As a consequence, similarly to the fourth feature, the updating of the appearance interval counter, which would have to be performed on an every transfer cycle basis, may be performed less frequently, i.e., at intervals several times longer than the transfer cycle (depending on an update period of the update timing generating means), when a required transfer rate is low, while the processing remains unchanged when a required processing rate is high. It is therefore possible to multiplex the monitoring processing for a large number of streams while maintaining a monitoring accuracy in accordance with a processing rate of interest.

According to a sixth aspect of the present invention, a processing rate monitoring apparatus comprises (1) event detecting means for notifying a monitored stream corresponding to an event appearing on a transmission path every transfer cycle, (2) a plurality of queue means each for forwardly feeding one or a plurality of identification information registered in an arbitrary step at inherent transfer periods, and for notifying the next event arrival scheduled timing, based on identification information output from a final step, for a monitored stream corresponding to the identification information, (3) a plurality of scheduled timing passage determining flag holding means, each operable when notification of event arrival scheduled timing is detected, to set a corresponding flag and holding the state of the flag at a stage prior to detection of a corresponding event, (4) determining means, operable each time one transfer cycle has elapsed, to determine whether or not an event of a corresponding monitored stream is detected for each of monitored streams and whether or not the passage of the next event arrival scheduled timing is notified from a corresponding queue, and to determine the presence or absence of processing rate violation of a processing rate in a current monitoring cycle from the state of the flag held in a corresponding scheduled timing passage determining flag holding means when any affirmative determination is recognized.

As a consequence, the determination as to the presence or absence of processing rate violation can be made on the basis of previously calculated next event arrival prediction timing. Additionally, in this event, the event arrival prediction timing can be set in accordance with a transfer period inherent to a corresponding queue means and a registered position of the identification information to a step, thereby making it possible to simultaneously realize a consistent monitoring accuracy and a reduction in processing frequency.

According to a seventh aspect of the present invention, a processing rate monitoring apparatus comprises (1) event detecting means for notifying a monitored stream corresponding to an event appearing on a transmission path every transfer cycle, (2) a plurality of queue means each for forwardly feeding one or a plurality of identification information registered in an arbitrary step at inherent transfer periods, and for notifying the next event arrival scheduled timing, based on identification information output from a final step, for a monitored stream corresponding to the identification information, (3) fluctuation tolerance value holding counters each for holding a fluctuation tolerance value for the occurrence of a processing rate violation determining cycle allowed to a corresponding monitored stream, (4) determining means, operable each time one transfer cycle has elapsed, to determine whether or not an event of a corresponding monitored stream is detected for each of monitored streams and whether or not the passage of the next event arrival scheduled timing is notified from a corresponding queue, and to determine the presence or absence of processing rate violation over a plurality of monitoring cycles by determining whether or not a count value of the fluctuation tolerance value holding counter is larger than a predetermined threshold value when an event is detected before the next event arrival scheduled timing passes.

As a consequence, the determination on the presence or absence of processing rate violation can be realized as determination as an average rate over a plurality of monitoring cycles rather than in a monitored cycle basis, so that this is advantageously applied for monitoring a processing rate when events occur in a burst manner.

DETAILED DESCRIPTION OF THE PREFERRED EMBODIMENTS

Outline of Respective Embodiments

Figure 1:
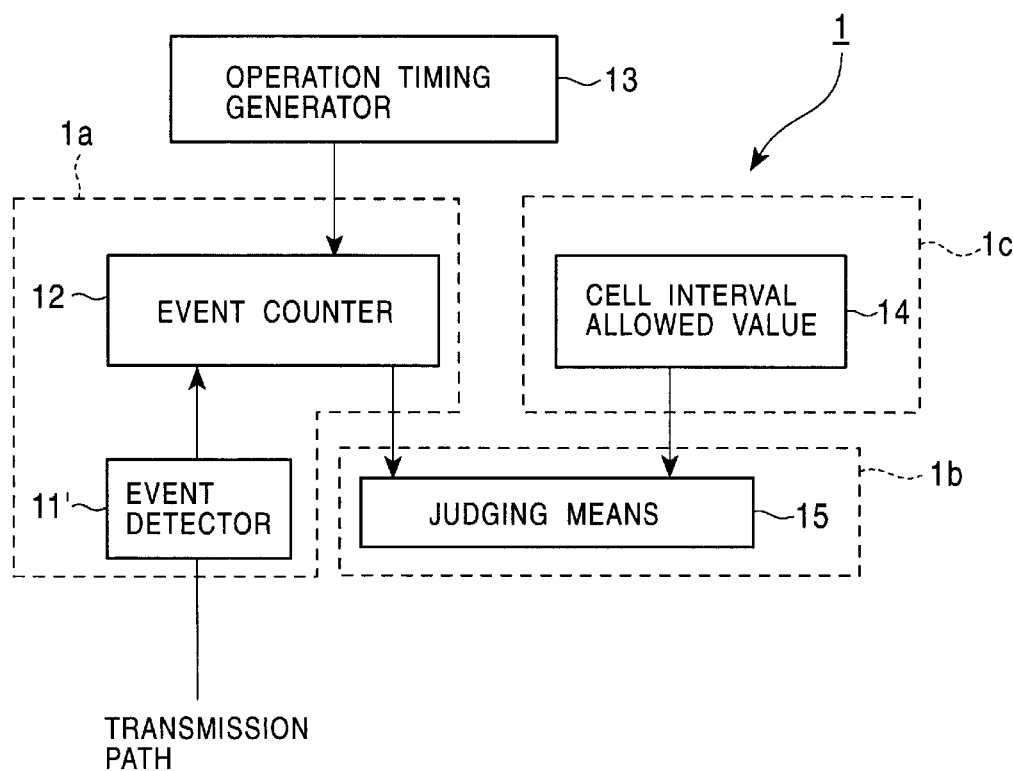
FIG. 1 is a block diagram illustrating the configuration of a cell rate monitoring apparatus according to a first embodiment of the present invention.

A processing rate monitoring apparatus according to the present invention will hereinafter be described in conjunction with a connection-based or a band-based (rate-based) cell rate monitoring method and apparatus to which the present invention is applied. It should be first noted that respective embodiments (first through eighth embodiments), described below in order, have the following features and mutual relationships, respectively.

A first embodiment relates to a scheme of monitoring a cell transfer rate by measuring a cell interval, wherein a cell interval derived from a cell transfer rate through a calculation is monitored using a counter which supports a real number value, i.e., a value including a decimal fraction.

A second embodiment, in addition to the feature of the first embodiment, also considers delay variations to simultaneously monitor the throughput over a plurality of monitoring cycles in a cell transfer service which has a tolerance set for fluctuations.

A third embodiment relates to a scheme of monitoring a cell transfer rate by measuring the number of cells appearing in a measurement interval, wherein a cell interval derived from a cell transfer rate through a calculation is monitored using a counter which supports a real number value, i.e., including a decimal fraction.

A fourth embodiment, in addition to the feature of the third embodiment, also considers delay variations to simultaneously monitor the throughput over a plurality of monitoring cycles in a cell transfer service which has a tolerance set for fluctuations.

A fifth embodiment, which enables the monitoring operation implemented by the second embodiment to be applicable even when a large number of connections are simultaneously monitored, aims at improving both accuracy and efficiency even when a band to be monitored extends over a wide range.

A sixth embodiment, which likewise enables the monitoring operation implemented by the fourth embodiment to be applicable even when a large number of connections are simultaneously monitored, aims at improving both accuracy and efficiency even when a band to be monitored extends over a wide range.

A seventh embodiment applies an approach referred to as a cell interval queue to the management of update timing for temporal information in the fifth embodiment, to enable the update timing management to adaptively support even an environment where a band required for each connection varies in a burst manner. In addition, the seventh embodiment monitors a cell transfer rate by introducing a state management flag referred to as a check flag.

An eighth embodiment is similar to the seventh embodiment in applying an approach referred to as a cell interval queue to the measurement of a cell interval, but introduces a parameter referred to as tolerance for managing a fluctuation tolerance value with respect to transfer timing to allow for monitoring of an average rate, instead of a cell interval check flag and a delay variation check flag in the seventh embodiment.

Now, the respective embodiments will hereinafter be described in order with regard to specific contents thereof.

First Embodiment

As mentioned above, the first embodiment relates to a scheme of monitoring a cell transfer rate by measuring a cell interval, and is characterized in that a cell interval derived from a cell transfer rate through a calculation is managed as a real number value, i.e., including a decimal fraction.
Configuration of First Embodiment FIG. 1 illustrates in a functional block diagram of the configuration of a cell rate monitoring apparatus according to the first embodiment.

Figure 2:
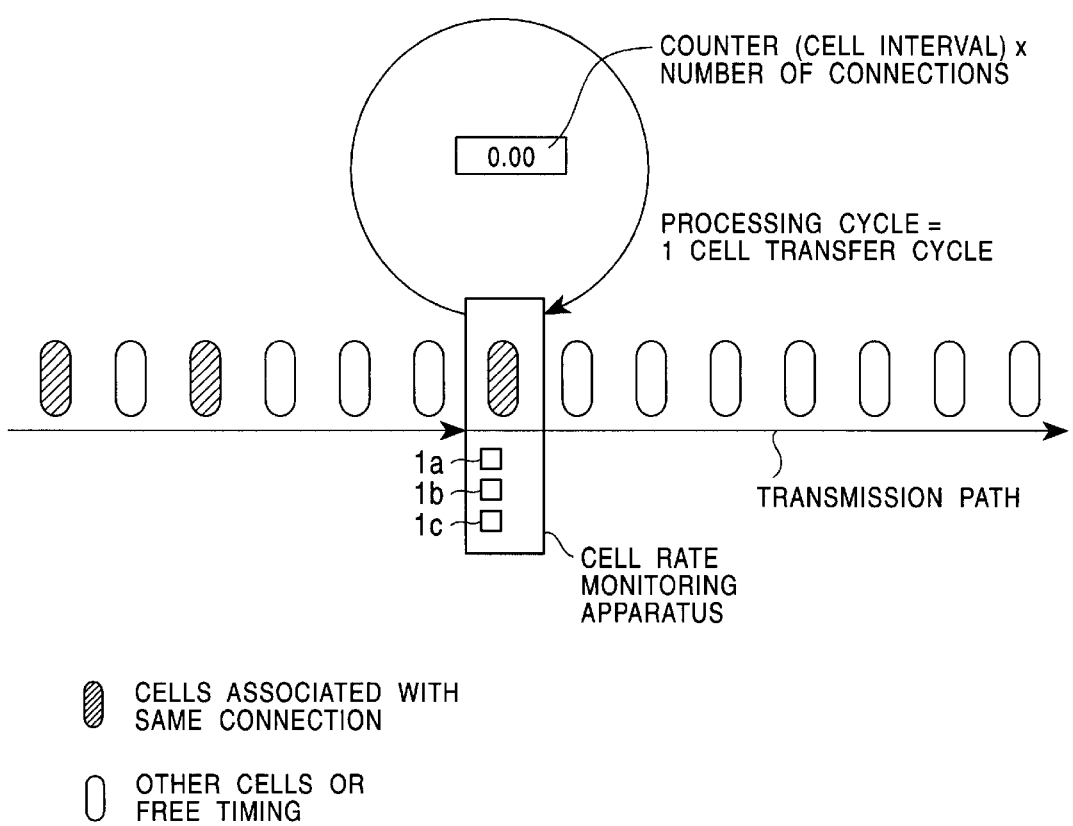
FIG. 2 is a diagram schematically illustrating the cell rate monitoring apparatus shown in FIG. 1.

FIG. 2 is a diagram schematically showing the cell rate monitoring apparatus shown in FIG. 1.

It should be noted that while FIG. 1 represents a configuration of the cell rate monitoring apparatus when associated functions are implemented in software for convenience, these functions may be actually implemented in hardware in a similar manner. The same is true for the remaining embodiments described below.

The cell rate monitoring apparatus 1 includes an event detector 11 which monitors the state of a connection set on a transmission path and detects an event (a cell), and an event counter 12 which measures events, that is, the interval of cells. The event detector 11 and event counter 12 constitute a cell interval counter $1a$. Operation timings are supplied to the event counter 12 from an operation timing generator 13.

The cell rate monitoring apparatus 1 further includes a memory $1c$ which stores control programs and intermediate data being generated. In the first embodiment, the memory $1c$ stores an allowed value 14 of the cell interval. The allowed value 14 takes the form of a value interval which represents an allowed value of a minimum interval of cells appearing at the monitored connection.

The cell rate monitoring apparatus 1 is provided with a processing device $1c$ which controls the processing operation according to a control program. A count value from the event counter 12 and the value interval from the memory $1c$ are supplied to the processing device $1b$. The processing device $1b$ is constituted by an MPU, and so on, and forms a judging means 15 for judging whether or not a violation of transfer rate occurs in the current monitoring cycle.

As shown in FIG. 2, the cell interval counter $1a$ is updated every cell transfer cycle such that it can count a cell interval extending from passage of a cell associated with a monitored connection to arrival of the next cell.

It should be noted herein that the cell interval counter $1a$ is provided with digits for supporting a decimal fraction as well as digits for supporting an integer number so that comparison, addition and subtraction can be performed on a value including a decimal fraction. In FIG. 2, the number of digits for decimal fraction is shown to be two.

Operation of First Embodiment

Figure 3:
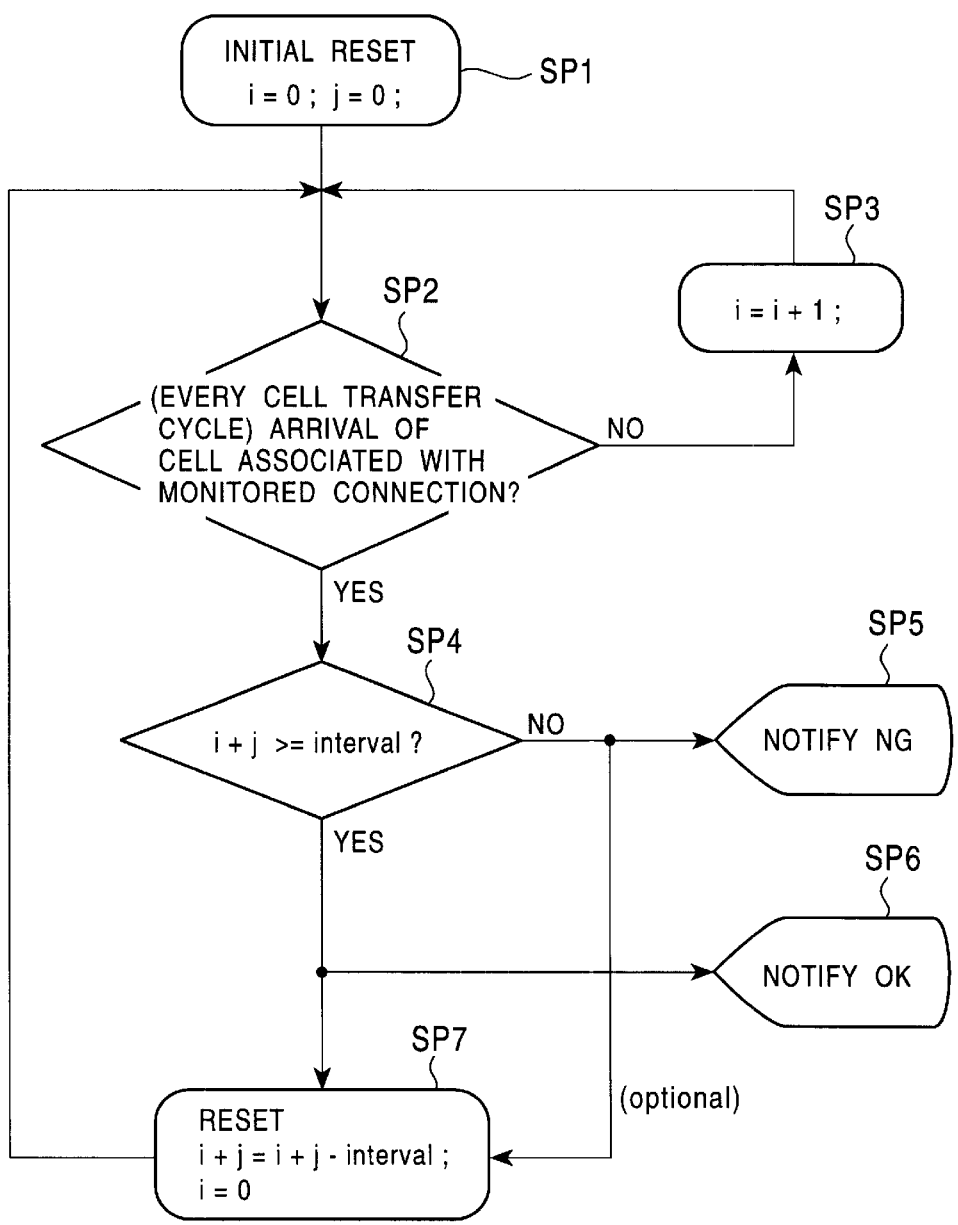
FIG. 3 is a flow chart illustrating a processing operation of the cell rate monitoring apparatus according to the first embodiment.

Next, a cell rate monitoring operation performed by the cell rate monitoring apparatus 1 having the configuration as described above will be explained with reference to FIGS. 3 and 4.
(a) Initial Rest First, at initial reset, the processing device $1b$ in the cell rate monitoring apparatus 1 initially sets (resets) both an integer number i and a decimal fraction j of the cell interval counter $1a$ for measuring a cell interval to "0" as shown in FIG. 3 (step SP1).

Alternatively, they may be initially set to an allowed value interval (a value for determining a minimum cell interval allowed for each connection), later described.
(b) Processing for Determining Presence/Absence of Arrival of Monitored Cell Next, the processing device $1b$ determines each time a cell transfer cycle has elapsed whether a cell that has arrived at that time is a cell associated with a connection which is monitored by the cell interval counter $1a$ (step SP2).

If determining that the incoming cell is not a cell associated with the monitored connection, the processing device $1b$ increments the count value of the corresponding counter $1a$ by "1." In other words, the integer number i is updated to i+1 (step SP3).

This counting operation is repeated until the processing device $1b$ determines the arrival of a cell associated with the monitored connection. For example, from a time point t0 to a time point t4 in FIG. 4, the count value of the cell interval counter $1a$ is sequentially updated as "0.00"→"1.00"→"2.00"→"3.00"→"4.00."
(c) Processing for Determining Presence/Absence of Rate Violation When a cell associated with the monitored connection is eventually arrives (for example, at the time point t4 in FIG. 4), the processing device $1b$ compares the count value of the cell interval counter $1a$ for measuring a cell interval with the value interval for determining a previously allowed minimum cell interval, and determines whether or not the cell rate is observed from the relationship of magnitude between the two values (step SP4).

In the comparison, if the value of the cell interval counter $1a$ is larger, the processing device $1b$ determines that the cell interval observes the cell rate, and proceeds to a notification operation therefor (step SP6) and a counter reset operation (step SP7).

On the other hand, if the value of the cell interval counter $1a$ is smaller, the processing device $1b$ determines that the cell interval violates the cell rate, and proceeds to a notification operation therefor (step SP5) and the counter reset operation (step SP7). It should be noted that when cell discard is selected upon determining cell rate violation, the counter reset operation is not executed as in FIG. 3.
(d) Counter Reset Operation The processing device $1b$, when proceeding to the counter reset operation (step SP7), subtracts the allowed value interval from the count value (i.e., i+j) of the cell interval counter $1a$, and resets the integer number i of the resulting real number value to zero.

Figure 4:
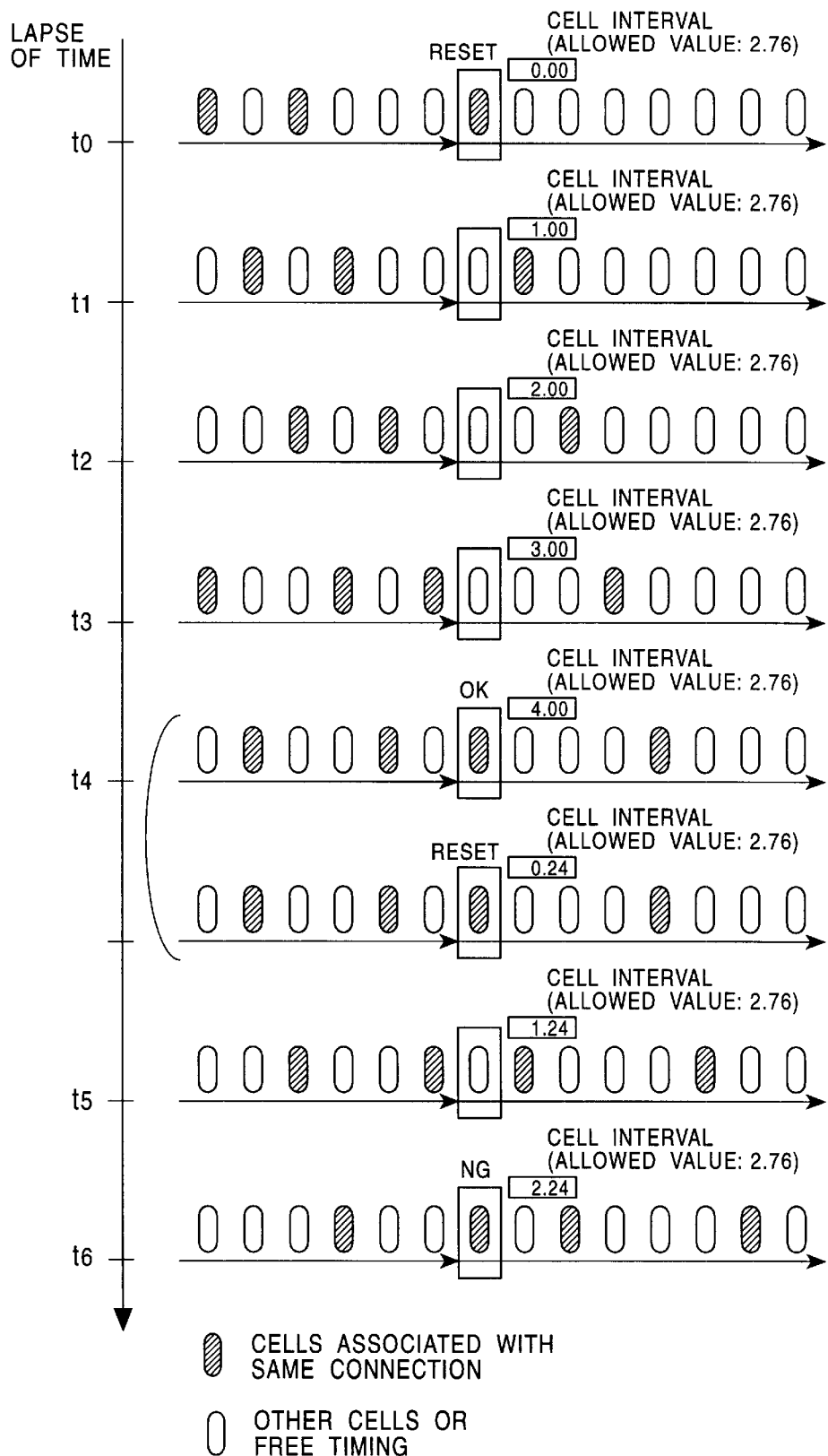
FIG. 4 is a conceptual diagram used for explaining the operation of the cell rate monitoring apparatus according to the first embodiment.

For example, at the time point t4 in FIG. 4, the count value of the cell interval counter $1a$ is reset to "0.24." This value is derived by subtracting the allowed value "2.76" from the count value "4.00" at that time point t4, and maintaining only the decimal fraction j of the resulting real number value "1.24" while replacing the integer number i with zero.

After the counter reset operation, the foregoing processing (a)–(d) is repeated so that the count-up operation is continued for the counter $1a$ until the next cell to be monitored is recognized. For example, the count value is updated as "0.24"→"1.24"→"2.24" as shown at time points t5, t6 in FIG. 4.

As described above, in the cell rate monitoring apparatus 1 according to the first embodiment, an extra time period which does not contribute to a transfer rate occurring in the previous cycle appears as a decimal fraction in the count value of the cell interval counter 1a, except for a cycle immediately after the initial setting, so that this time period can be reflected to the determination of a cell rate in the next cycle.

Example of Each Set Value

Assume that the allowed value interval used herein is defined by the following equation:

$$interval = P/R$$

where P is a general cell rate of cells passing through a transmission path in [cells/sec], and R is a cell rate for a monitored connection in [cells/sec]. The value interval is represented in units of cell transfer cycles.

Effect of First Embodiment

According to the first embodiment as described above, when a cell rate is monitored by measuring a cell interval, a count value of the cell interval counter 1a, which supports a real number, is compared with an allowed value, represented in a real number value, calculated from the cell rate to monitor the cell rate, so that an error possibly caused by the monitoring can be reduced as compared with the prior art which monitors a cell rate only using an integer number counter, thus making it possible to further improve a monitoring accuracy.

It goes without saying that while the technique described above is particularly effective for the case where a cell rate is variable, it is likewise effective when a cell rate is fixed.

Second Embodiment

In continuation, a second embodiment will be described. As mentioned above, the second embodiment is such one that adds a function for taking into account delay variations to the cell rate monitoring apparatus according to the first embodiment.

Configuration of Second Embodiment

Figure 5:
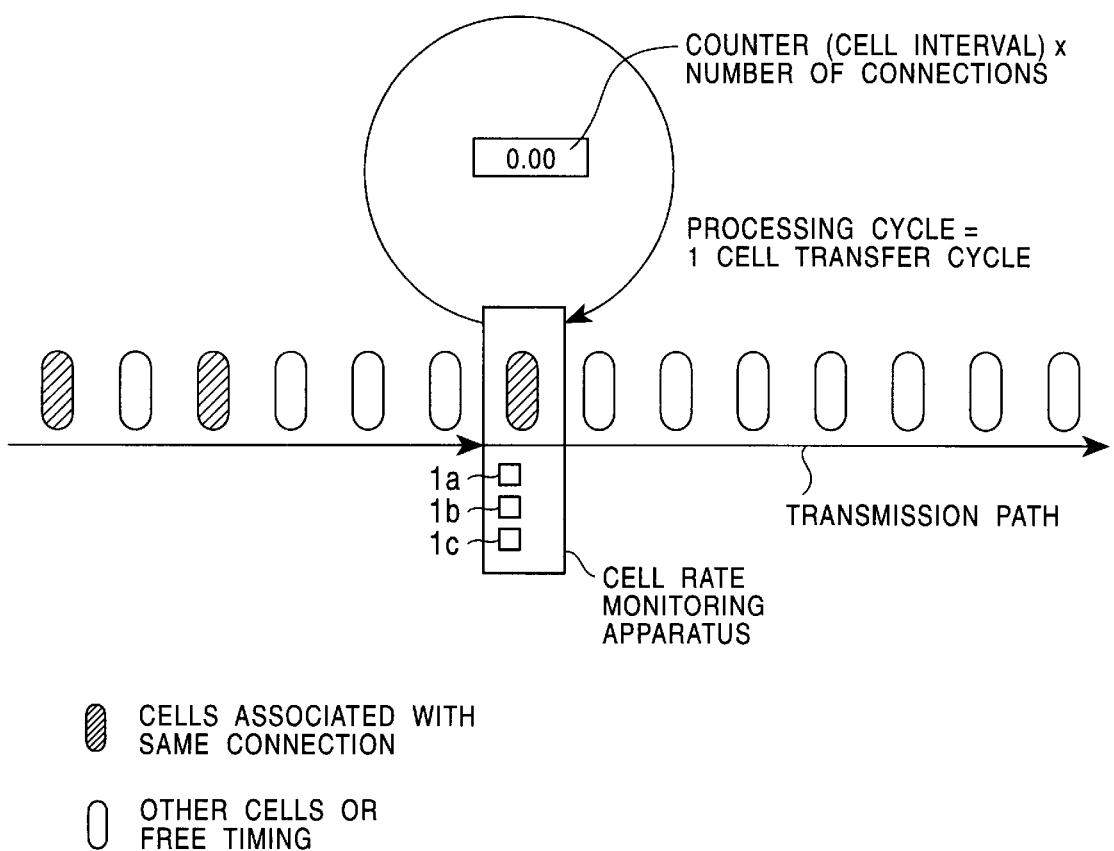
FIG. 5 is a block diagram illustrating the configuration of a cell rate monitoring apparatus according to a second embodiment.

FIG. 5 illustrates in a functional block diagram the configuration of a cell rate monitoring apparatus 1 according to a second embodiment. As can be seen in the drawing, the cell rate monitoring apparatus 1 according to the second embodiment is identical in basic configuration to the cell rate monitoring apparatus according to the first embodiment. The two embodiments differs only in the contents of the control program stored in the memory 1c. Therefore, the cell rate monitoring apparatus 1 of the second embodiment is identical to the cell rate monitoring apparatus of the first embodiment in that it employs a cell interval counter 1a which supports a real number value, and that the processing device 1b executes a monitoring operation based on the control program.

In the second embodiment, the number of appearances of the cell is counted by the event counter. Consequently, the counter 1a functioning as the cell interval counter for counting the interval of cell appearance in the first embodiment functions as a counter for counting the number of cell appearances.

In this cell rate monitoring apparatus also, the event counter capable of handling real number can be used as it is.

Operation of Second Embodiment

Figure 6:
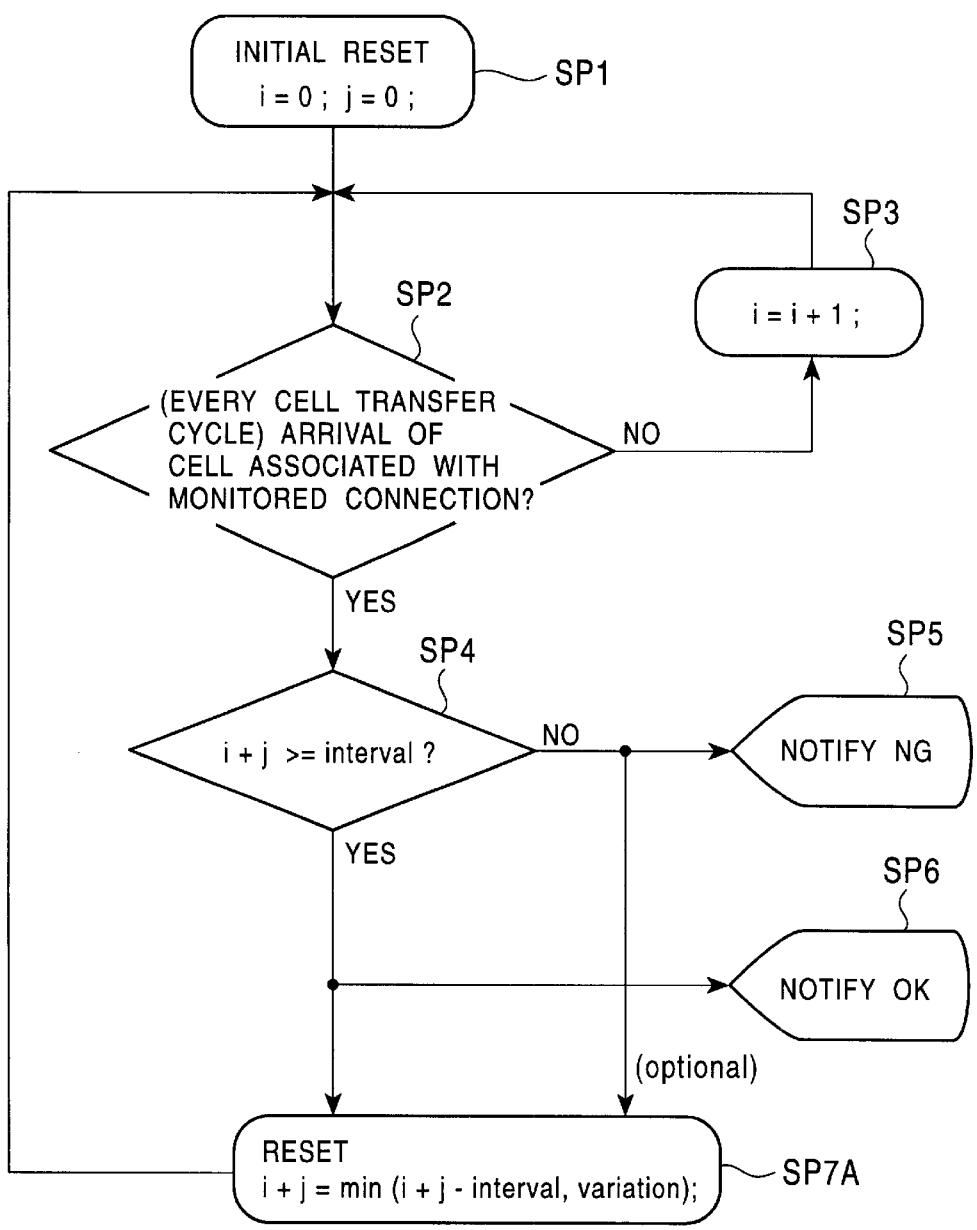
FIG. 6 is a flow chart illustrating a processing operation of the cell rate monitoring apparatus according to the second embodiment.

In the following, a cell rate monitoring operation performed by the cell rate monitoring apparatus 1 having the configuration described above will be described with reference to FIG. 6. In FIG. 6, parts corresponding to or identical to those in FIG. 3 are designated corresponding or same reference numerals, and the operations in (a)–(c) described below are the same as those in the first embodiment. A characteristic portion of the second embodiment therefore lies in the operation in (d).

(a) Initial Reset

First, at initial reset, the processing device 1b in the cell rate monitoring apparatus 1 initially sets (resets) both an integer number i and a decimal fraction j of the cell interval counter 1a to "0" as shown in FIG. 6 (step SP1).

Alternatively, they may be initially set to an allowed value interval (a value for determining a minimum cell interval allowed for each connection), later described.

(b) Processing for Determining Presence/Absence of Arrival of Monitored Cell

Next, the processing device 1b determines, each time a cell transfer cycle has elapsed, whether a cell that has arrived at that time is a cell associated with a connection which is monitored by the cell interval counter 1a (step SP2).

If determining that the incoming cell is not a cell associated with a monitored connection, the processing device 1b increments the count value of the associated cell interval counter 1a by "1." In other words, the integer number i is updated to i+1 (step SP3).

This counting operation is repeated until the processing device 1b determines the arrival of a cell associated with a monitored connection.

(c) Processing for Determining Presence/Absence of Rate Violation

When a cell associated with a monitored connection eventually arrives, the processing device 1b compares the count value of the cell interval counter 1a for measuring a cell interval with the value interval for determining a previously allowed minimum cell interval, and determines whether or not the cell rate is observed from the relationship of magnitude between the two values (step SP4).

In the comparison, if the value of the cell interval counter 1a is larger, the processing device 1b determines that the cell interval observes the cell rate, and proceeds to a notification operation therefor (step SP6) and a counter reset operation (step SP7A).

On the other hand, if the value of the cell interval counter 1a is smaller, the processing device 1b determines that the cell interval violates the cell rate, and proceeds to a notification operation therefor (step SP5) and the counter reset operation (step SP7A). It should be noted that when cell discard is selected upon determining cell rate violation, the processing device 1b does not execute the counter reset operation as shown in FIG. 6.

(d) Counter Reset Operation

The processing device 1b, when proceeding to the counter reset operation (step SP7A), compares a real number value (i+j−interval) calculated by subtracting the allowed value interval from the count value of the cell interval counter 1a (i.e., i+j) with a delay variation tolerance value variation (in units of cell transfer cycles) given as a real number value, and resets the integer number i and the decimal fraction j with the smaller value.

In this way, the amount of delay can be carried over within an allowable range defined as the delay variation tolerance value variation.

Then, after the counter reset operation, the foregoing processing (a)–(d) is repeated to continue the count-up operation for the cell interval counter 1a in a similar manner until the next cell to be monitored is recognized.

Example of Each Set Value

The foregoing description has been made on the case where the delay variation tolerance value variation is given in units of cell transfer cycles. When this value is given in time [sec], the value must be previously multiplied by a cell transfer rate (in the number of cells per second) to be converted to a value in units of cell transfer cycles.

More specifically, when the transfer rate of a transmission path is for example 622.08 Mpbs, the delay variation tolerance value variation in time [sec] must be previously multiplied by the value calculated by $622.08/(53\times8) \approx 1.46717 \times 10^6$ [cells/sec]. This is a value derived on the assumption that the amount of data per cell is given by $53\times8$ bps.

Also, in the second embodiment, the allowed value interval is defined as a value given by:

$$\text{interval} = P/R$$

where P is a general cell rate of cells passing through a transmission path in [cells/sec], and R is a cell rate for a monitored connection in [cells/sec]. The value interval is represented in units of cell transfer cycles.

Effect of Second Embodiment

As described above, the second embodiment additionally provides a monitoring operation reflecting the delay variation tolerance value as well as produces similar effects to those of the first embodiment.

In addition, even if the tolerance is increased by a delay variation allowable amount allowed in one monitoring cycle, it is possible to reflect to the next cycle the degree of influence actually exerted by the delay variation tolerance portion, thereby making it possible to simultaneously monitor the throughput over a plurality of cycles by detection of violation in each monitoring cycle.

Third Embodiment

As mentioned above, the third embodiment relates to a scheme of monitoring a cell transfer rate by measuring the number of cells appearing in a measurement interval, and is characterized in that a cell interval derived from a cell transfer rate through a calculation is managed as a real number value, i.e., as a value including a decimal fraction.

Configuration of Third Embodiment

Figure 7:
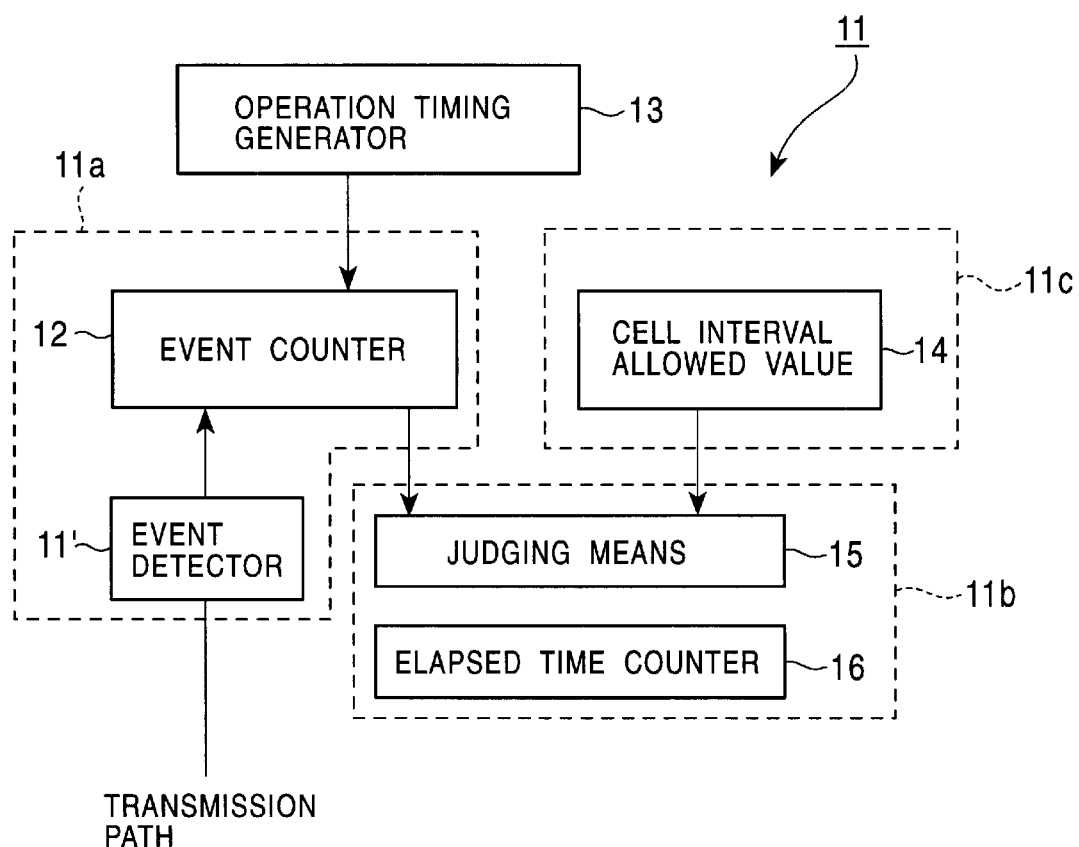
FIG. 7 is a block diagram illustrating the configuration of a cell rate monitoring apparatus according to a third embodiment.

FIG. 7 is a block diagram showing the configuration of a cell rate monitoring apparatus according to the third embodiment.

Figure 8:
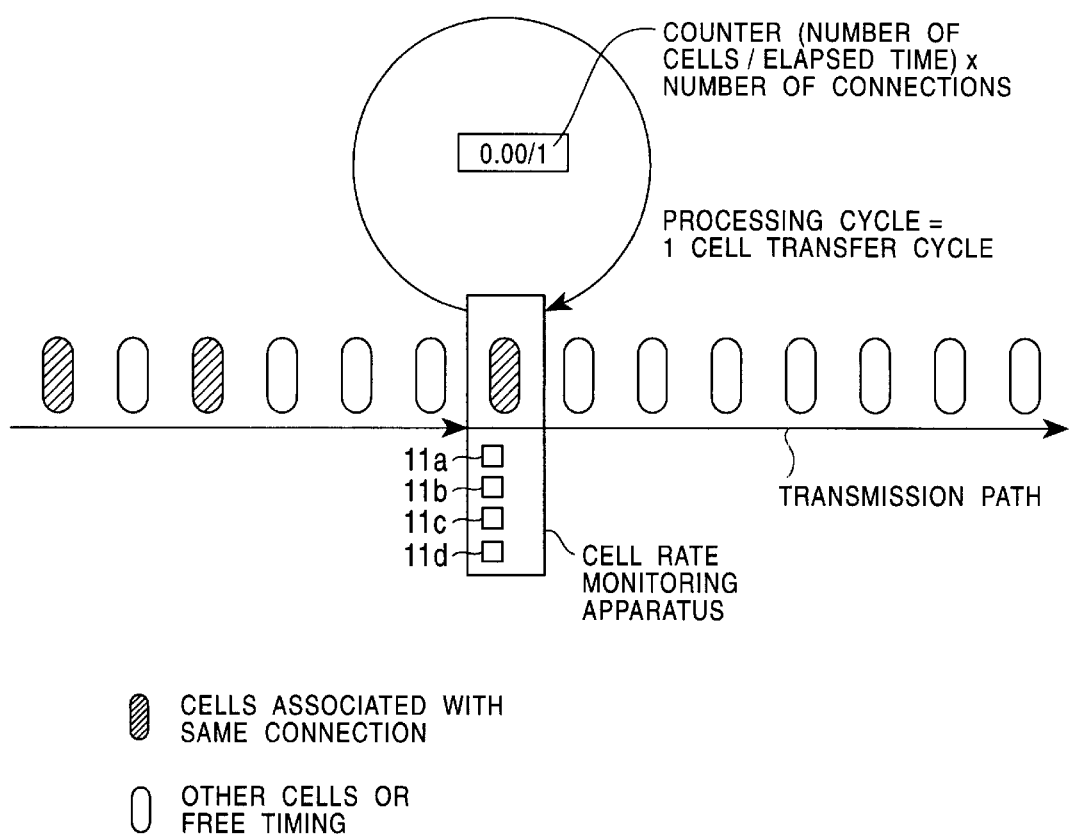
FIG. 8 is a diagram schematically illustrating the cell rate monitoring apparatus shown in FIG. 7.

FIG. 8 is a diagram schematically showing the cell rate monitoring apparatus shown in FIG. 7.

As shown in FIG. 7, the cell rate monitoring apparatus 11 comprises a plurality of cell number counters 11a each corresponding to each of connections set on a transmission path (in FIGS. 7 and 8, only one is schematically illustrated), a processing device (based on an MPU (micro processor unit) or the like) 11b, a memory 11c for storing a control program and so on, and an elapsed time counter 11d.

As shown in FIG. 7, each of the plurality of cell interval counters 11a is constituted by an event detector 11 and an event counter 12. The cell rate monitoring device includes the processing device 11b which forms the judging means 15 and further includes an elapsed time counter 16. The elapsed time counter may be a counter 11d provided outside the processing device 11b as illustrated in FIG. 8.

The cell counter 11a is updated each time the arrival of a cell associated with a monitored connection is recognized, while the elapsed time counter 11d is updated every cell transfer cycle.

With such operations, the cell number counter 11a can count the number of cells associated with a monitored connection which have arrived within a predetermined measuring period period set for the cell number counter 11a. It should be noted that this cell number counter 11a also has not only digits corresponding to an integer number but also digits corresponding to a decimal fraction so that comparison, addition and subtraction can be performed on a value including a decimal fraction. In FIG. 8, the number of digits for decimal fraction is shown to be two.

The elapsed time counter 11d in turn is a counter which is updated every cell transfer cycle, and is used to measure the measuring period period.

Operation of Third Embodiment

Next, a cell rate monitoring operation performed by the cell rate monitoring apparatus having the configuration described above will be described below with reference to FIGS. 9 and 10.

(a) Initial Reset

Figure 9:
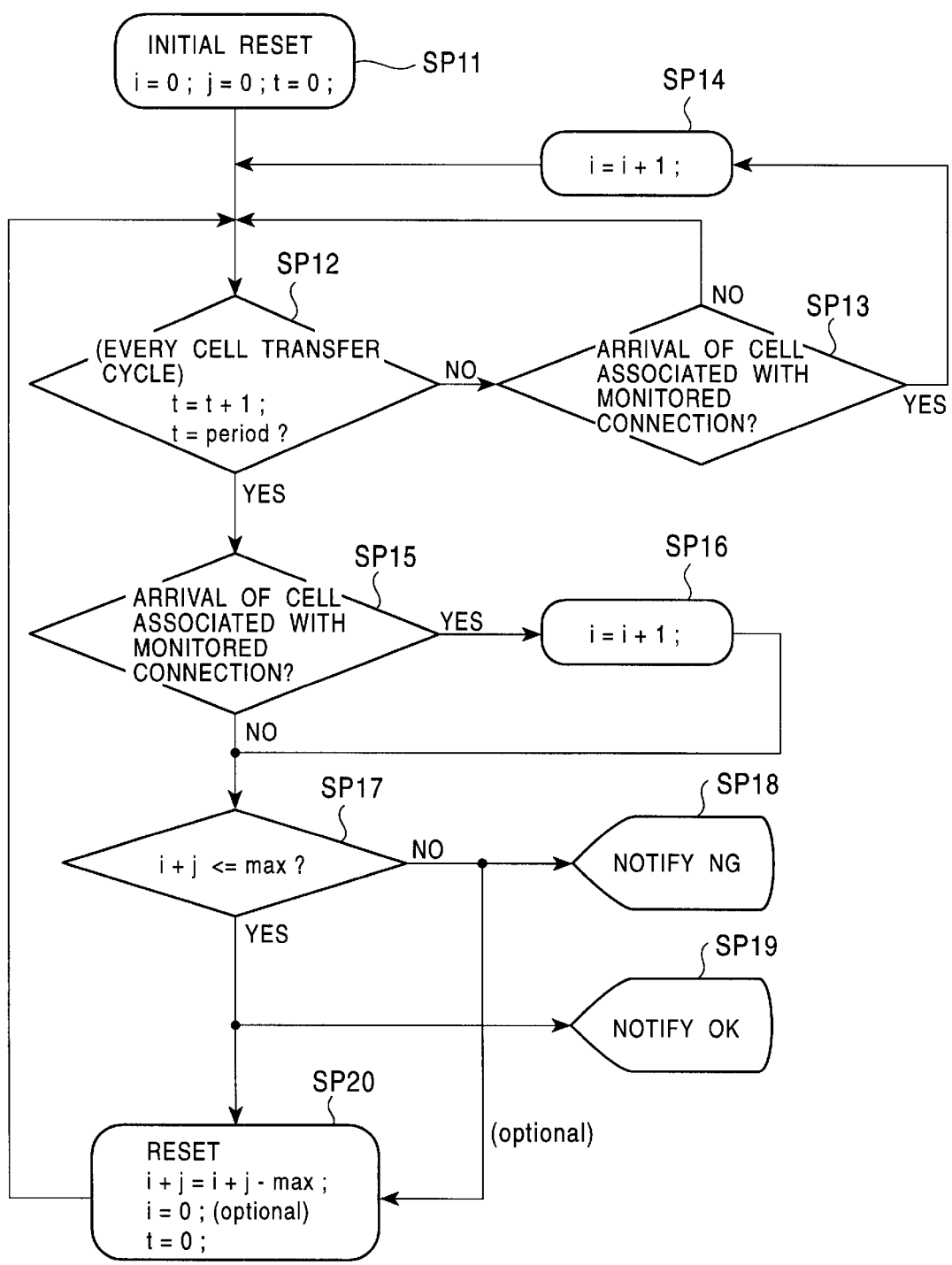
FIG. 9 is a flow chart illustrating a processing operation of the cell rate monitoring apparatus according to the third embodiment.

First, at initial reset, the processing device 11b in the cell rate monitoring apparatus 11 resets an integer number i and a decimal fraction j of the cell number counter 11a for measuring the number of cells as well as the count value of the elapsed time counter 11d to "0" (step SP11), as shown in FIG. 9.

Alternatively, the cell number counter 11a is initially set to an allowed value max (a maximum number of cells that can appear within a measuring period allowed for each connection) later described.

(b) Processing for Determining Lapse of Measuring Period

Next, the processing device 11b increments the count value of the elapsed time counter 11d by "1" each time one cell transfer cycle has elapsed. In other words, the processing device 11b updates a time count value t to t+1 (step SP12).

The counting operation is repetitively executed until it is determined that an updated time amounts to the previously defined measuring period period (in units of cell transfer cycles). For example, the count value of the elapsed time counter 11d is sequentially updated as "1"→"2"→"3" . . . →"9" as shown from a time point t0 to a time point t8 in FIG. 10.

(c) Processing for Determining Presence/Absence of Arrival of Monitored Cell

This processing is executed every cell transfer cycle until the lapse of the measuring period is determined in the processing (b). In other words, the processing device 11b determines, each time a negative result is returned at step SP12, whether or not an incoming cell at a current timing is a cell associated with a connection monitored by the cell number counter 11a (step SP13).

The processing device 11b, when determining that the incoming cell is a cell associated with the monitored connection, instructs the corresponding cell number counter 11a to increment its count value by "1" (step SP14). On the other hand, when determining that the incoming cell is not a cell associated with the monitored connection, the processing device 11b returns to step SP12, without adding any change to the count value of the cell number counter 11a, and enters a waiting state to wait for the next cell transfer cycle to come.

Figure 10:
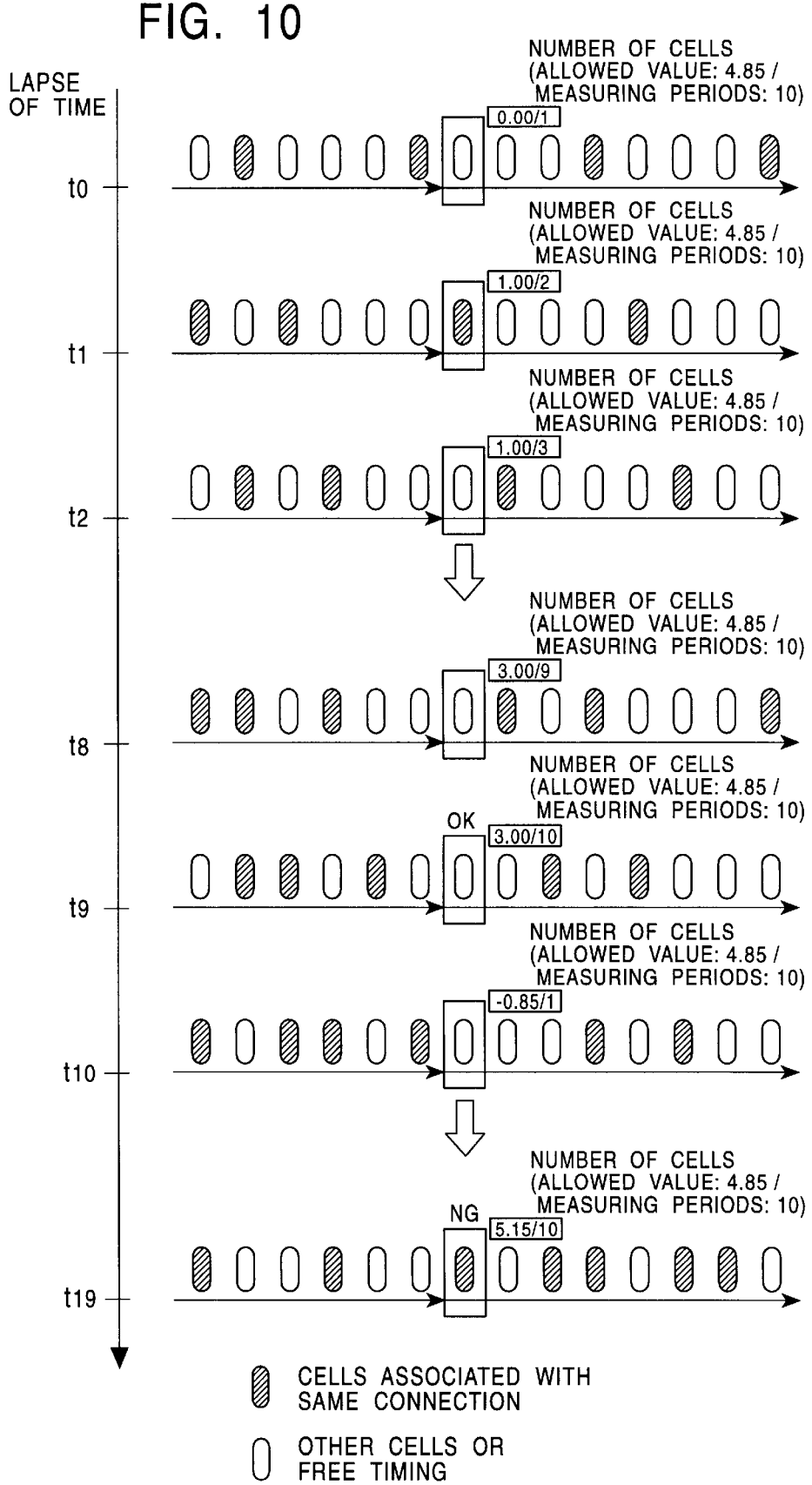
FIG. 10 is a conceptual diagram used for explaining the operation of the cell rate monitoring apparatus according to the third embodiment.

For example, in FIG. 10, since cells associated with the monitored connection arrive at a time point t1, at a time point t5 and at a time point t7, the cell number counter 11a exhibits the count value set at "3.00" at a time point t9.

(d) Processing for Determining Presence/Absence of Rate Violation

When eventually determining that a predetermined measuring period has elapsed (for example, at the time point t9 in FIG. 10 (assume however that there are ten measuring periods)), the processing device 11b further determines whether or not a cell associated with the monitored connection has arrived at this time (step SP15).

Then, the processing device 11b determines whether or not the cell rate is observed for the monitored connection by using the count value of the cell number counter 11a after it has been incremented by "1" if a cell has arrived (step SP16) and otherwise by using the count value of the cell number counter 11a registered up to the previous cell transfer cycle (step SP17).

Here, the processing device 11b compares the count value of the cell number counter 11a with a maximum value max of the number of cells allowed within a measuring period for the connection, and performs a cell rate determining operation from the relationship of magnitude between the two values.

If the count value of the cell number counter 11a is smaller, the processing mean 11b determines that the number of cells within the measuring period observes the cell rate, and proceeds to a notification operation therefor (step SP19) and the counter reset operation (step SP20).

Conversely, if the count value of the cell number counter 11a is larger, the processing device 11b determines that the number of cells within the measuring period has violated the cell rate and is further increasing, and proceeds to a notification operation therefor (step SP18) and the counter reset operation (step SP20). It should be noted that when cell discard is selected upon determining cell rate violation, the processing device 11b does not execute the counter reset operation as shown in FIG. 9.

(e) Counter Reset Operation

The processing device 11b, when proceeding to the counter reset operation (step SP20), subtracts the allowed value max (corresponding to an inverse number of the cell interval allowed value value 14 stored in memory 11c) from the count value (i.e., i+j) of the cell number counter 11a, and resets to zero the integer number i within the resulting real number value.

For example, as shown at a time point t10 in FIG. 10 (while this time point corresponds to the first cell transfer cycle in the next measuring period, this time point is used since the value after reset is still held in the embodiment of FIG. 10), the count value of the cell number counter 11a is reset to "−0.85." This value is derived by subtracting an allowed value "4.85" from the count value "3.00" of the cell number counter 11a, and maintaining unchanged the decimal fraction j of the resulting real number value "−1.85" while replacing the integer number i with zero.

Also, at this time, the count value of the elapsed time counter 11d is simultaneously reset to "0."

After the counter reset operation, the processing device 11b repetitively executes the foregoing processing (a)–(e) to continue the cell number counting operation, until the expiration of the next measuring period is recognized, for counting cells associated with the monitored connection, which have arrived in the meantime. In the embodiment shown in FIG. 10, the count value of the cell number counter 11a indicates "5.15" at a time point t19 at which the next measuring period expires. It is therefore understood that an excessive number of cells have arrived even taking into account an insufficient number of cells which had arrived within the previous measuring period.

Example of Each Set Value

Assume that the allowed value max used herein, i.e., a maximum value for the number of cells allowed within a measuring period for a monitored connection, is defined by the following equation:

$$\max = (P/R) \times \text{period}$$

where P is a general cell rate of cells passing through a transmission path in [cells/sec], and R is a cell rate for a monitored connection in [cells/sec]. The value max is represented in units of the number of cells per period cell transfer cycles.

Effect of Third Embodiment

According to the third embodiment as described above, when a cell rate is monitored by measuring the number of cells within a set measuring period, a count value of the cell number counter 11a which supports a real number value is compared with an allowed value in real number calculated from the cell rate to monitor the cell rate, so that an error possibly caused by the monitoring can be reduced as compared with the prior art which monitors a cell rate only using an integer number counter, thus making it possible to further improve a monitoring accuracy.

It goes without saying that while the technique described above is particularly effective for the case where a cell rate is variable, it is likewise effective when a cell rate is fixed.

Fourth Embodiment

In continuation, a fourth embodiment will be described. As mentioned above, the fourth embodiment is such one that adds a function for taking into account delay variations to the cell rate monitoring apparatus according to the third embodiment.

Configuration of Fourth Embodiment

Figure 11:
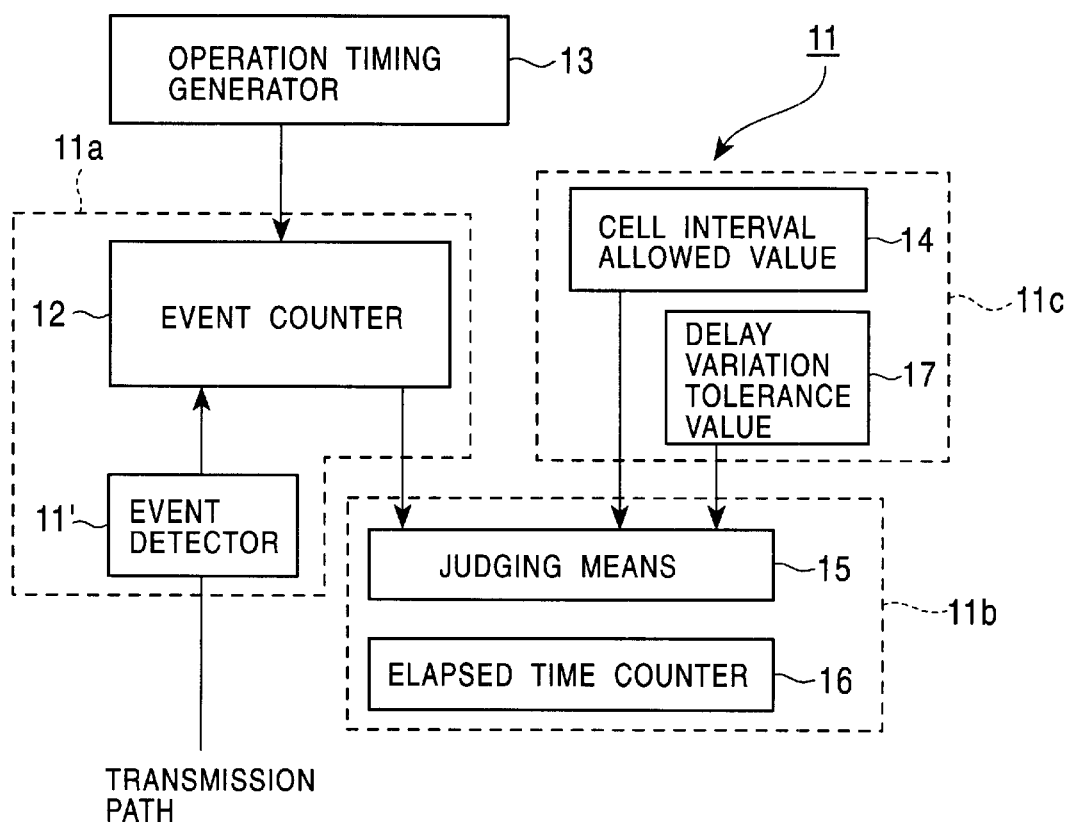
FIG. 11 is a block diagram illustrating the configuration of a cell rate monitoring apparatus according to a fourth embodiment of the present invention.

FIG. 11 illustrates in a functional block diagram the configuration of a cell rate monitoring apparatus 11 according to the fourth embodiment. As can be seen from FIG. 11, the cell rate monitoring apparatus 11 according to the fourth embodiment is also identical in basic configuration to the cell rate monitoring apparatus according to the third embodiment shown in FIGS. 7 and 8. The two embodiments differs only in that a delay variation tolerance value 17 (variation) is stored in the memory 1c in addition to the cell interval allowed value 14, and the contents of the control program are changed accordingly. Therefore, the cell rate monitoring apparatus 11 of the fourth embodiment is identical to the cell rate monitoring apparatus of the third embodiment in that it employs a cell number counter 11a which supports a real number, and that the processing device 11b executes a monitoring operation based on the control program.

Figure 12:
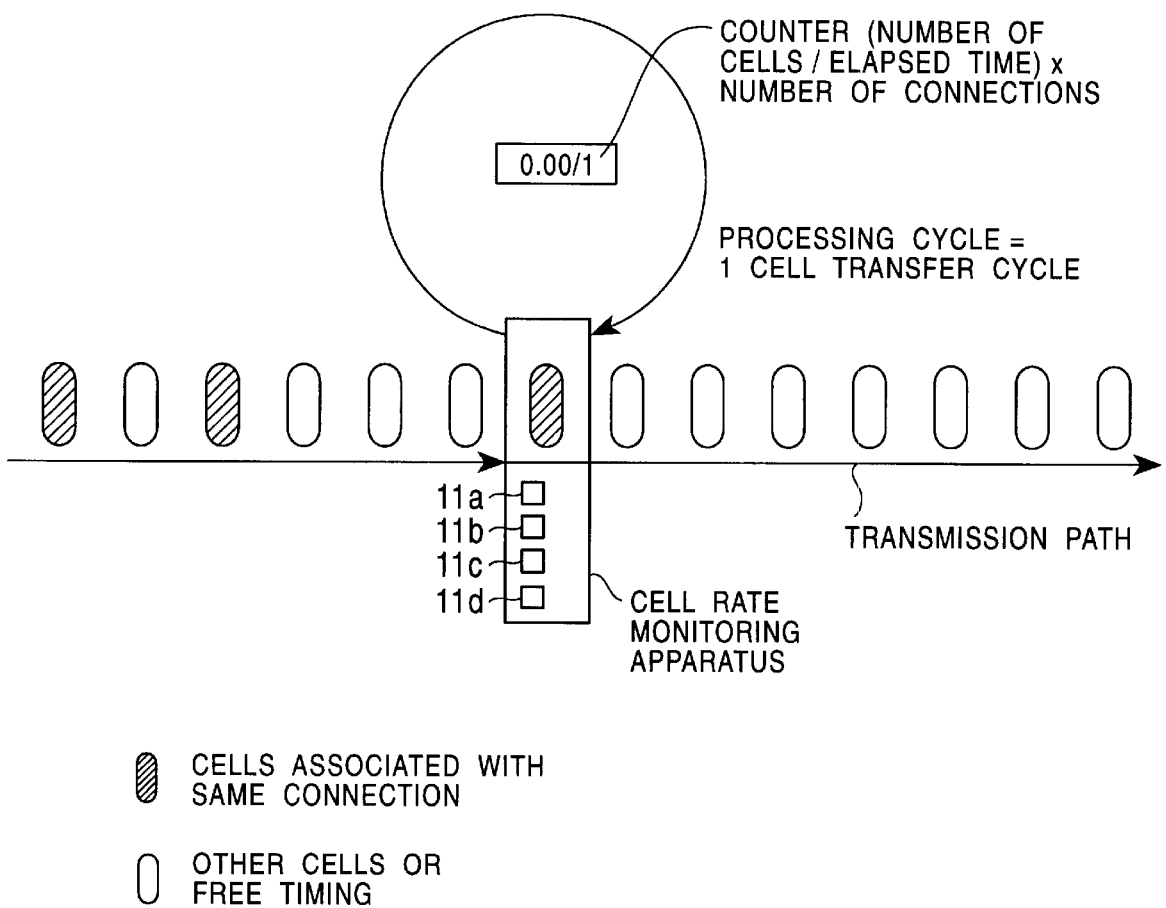
FIG. 12 is a diagram schematically illustrating the cell rate monitoring apparatus shown in FIG. 11.

FIG. 12 illustrates in a functional block diagram the configuration of a cell rate monitoring apparatus shown in FIG. 11.

Operation of Fourth Embodiment

Figure 13:
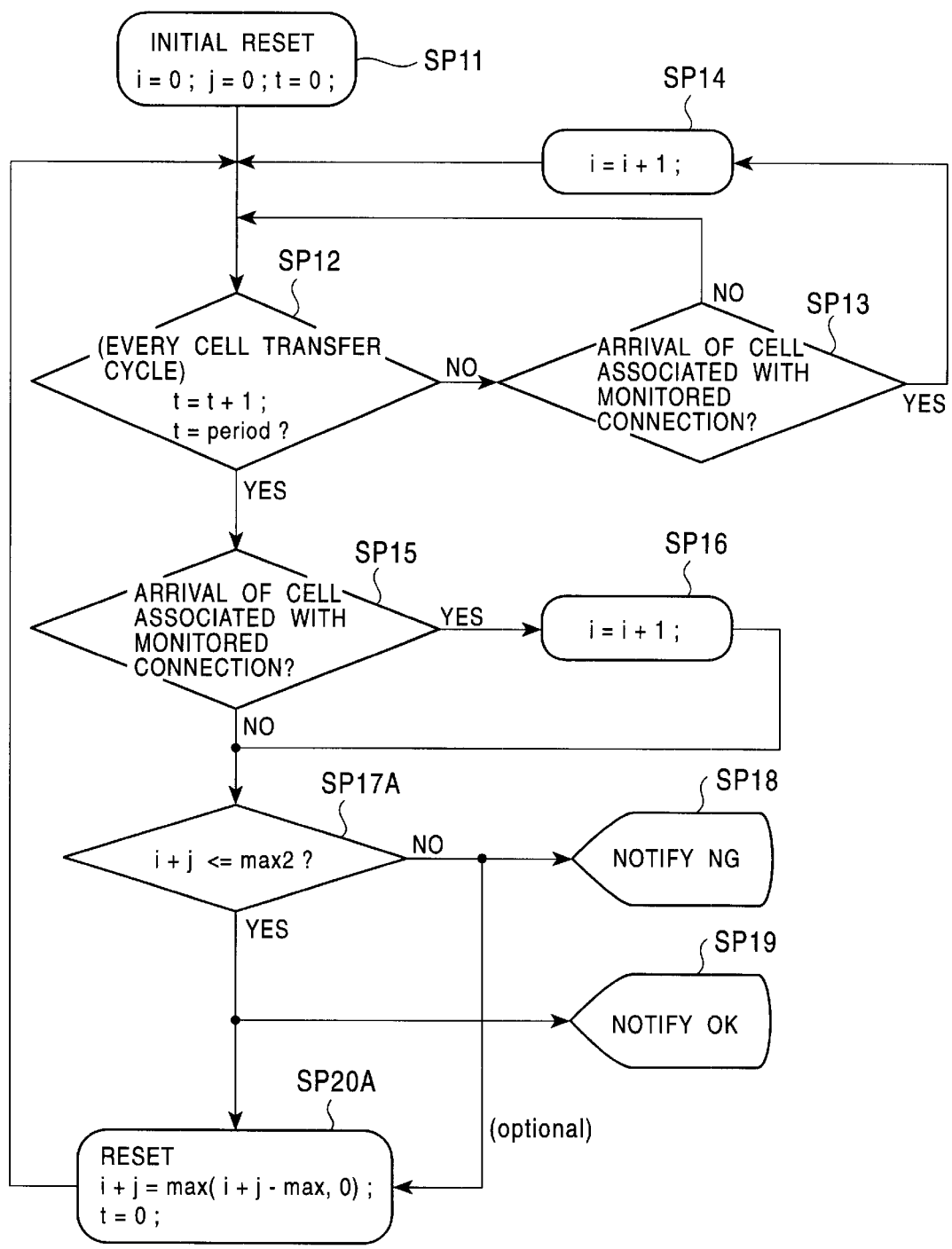
FIG. 13 is a flow chart illustrating a processing operation of the cell rate monitoring apparatus according to the fourth embodiment.

In the following, a cell rate monitoring operation performed by the cell rate monitoring apparatus 11 having the configuration described above will be described with reference to FIG. 13. In FIG. 13, parts corresponding to or identical to those in FIG. 9 are designated corresponding or same reference numerals, and the operations in (a)–(c) described below are the same as those in the third embodiment. A characteristic portion of the fourth embodiment therefore lies in the operations in (d) and (e).

(a) Initial Reset

First, at initial reset, the processing device 11b in the cell rate monitoring apparatus 11 resets an integer number i and a decimal fraction j of the cell number counter 11a for measuring the number of cells as well as the count value of the elapsed time counter 11d to "0" (step SP11) as shown in FIG. 9.

Alternatively, the cell number counter 11a is initially set to an allowed value max (corresponding to an inverse number of the cell interval allowed value value 14 stored in memory 11c), later described (a maximum number of cells that can appear within a measuring period allowed for each connection. The allowed value, when delay variations are taken into account, is hereinafter labelled as max2).

(b) Processing for Determining Lapse of Measuring Period

Next, the processing device 11b increments the count value of the elapsed time counter 11d by "1" each time one cell transfer cycle has elapsed. In other words, the processing device 11b updates a time count value t to t+1 (step SP12).

The counting operation is repetitively executed until it is determined that an updated time amounts to the previously defined measuring period period (in units of cell transfer cycles).

(c) Processing for Determining Presence/Absence of Arrival of Monitored Cell

This processing is executed every cell transfer cycle until the lapse of the measuring period is determined in the processing (b). In other words, the processing device 11b determines, each time a negative result is returned at step SP12, whether or not an incoming cell at a current timing is a cell associated with a connection monitored by the cell number counter 11a (step SP13).

The processing device 11b, when determining that the incoming cell is a cell associated with the monitored connection, instructs the corresponding cell number counter 11a to increment its count value by "1" (step SP14). On the other hand, when determining that the incoming cell is not a cell associated with the monitored connection, the processing device 11b returns to step SP12, without adding any change to the count value of the cell number counter 11a, and enters a waiting state to wait for the next cell transfer cycle to come.

(d) Processing for Determining Presence/Absence of Rate Violation

When eventually determining that a predetermined measuring period has elapsed, the processing device 11b further determines whether or not a cell associated with the monitored connection has arrived at this time (step SP15).

Then, the processing device 11b determines whether or not the cell rate is observed for the monitored connection by using the count value of the cell number counter 11a after it has been incremented by "1" if a cell has arrived (step SP16) and otherwise by using the count value of the cell number counter 11a registered up to the previous cell transfer cycle (step SP17A).

Here, the processing device 11b compares the count value of the cell number counter 11a with the maximum value max2 which indicates a maximum number of cells allowed within a measuring period for the connection in consideration of delay variations, and performs a cell rate determining operation from the relationship of magnitude between the two values. Thus, the fourth embodiment differs from the third embodiment in that the processing device 11b uses the maximum number of cells allowed within a measuring period in consideration of delay variations in this determination processing.

If the count value of the cell number counter 11a is smaller, the processing mean 11b determines that the number of cells within the measuring period observes the cell rate, and proceeds to a notification operation therefor (step SP19) and a counter reset operation (step SP20A).

On the other hand, if the count value of the cell number counter 11a is larger, the processing device 11b determines that the number of cells within the measuring period has violated the cell rate and is further increasing, and proceeds to a notification operation therefor (step SP18) and the counter reset operation (step SP20A). It should be noted that when cell discard is selected upon determining cell rate violation, the processing device 11b does not execute the counter reset operation as shown in FIG. 13.

(e) Counter Reset Operation

The processing device 11b, when proceeding to the counter reset operation (step SP20A), compares a real number value (i+j−max) derived by subtracting the allowed value max (without taking into account delay variations) from the count value (i.e., i+j) of the cell number counter 11a with zero, and resets both the integer number i and the decimal fraction j with the larger value.

In this way, a delay amount can be carried over within a range of allowed delay variation amount (max−max2).

In this event, the count value of the elapsed time counter 11d is also reset to "0" at the same time.

Then, after the counter reset operation, the processing device 11b repetitively executes the foregoing processing (b)–(e) to continue the cell number counting operation, until the expiration of the next measuring period is recognized, for counting cells associated with the monitored connection, which have arrived in the meantime.

Example of Each Set Value

For the allowed value max used herein, which does not take into account delay variations, i.e., the maximum number of cells allowed during a measuring period for a monitored connection, assume that a value defined by the following equation is used:

$$max = P/R \times period$$

where P is a general cell rate of cells passing through a transmission path in [cells/sec], and R is a cell rate for a monitored connection in [cells/sec]. The value max is represented in units of the number of cells per period cell transfer cycles.

Also, for the allowed value max2 used herein, which takes into account delay variations, i.e., the maximum number of cells allowed in a state where delay variations are taken into account during a measuring period for a monitored connection, that is, when the delay variation tolerance value variation is given as a value represented in units of cell transfer cycles, assume that a value defined by the following equation is used:

$$max2 = max \times \frac{period}{period - variation}$$

The value is represented in units of the number of cells per period cell transfer cycles.

It should be noted however that if the delay variation tolerance value variation is given in units of time [sec], the value must be previously multiplied by a cell transfer rate (in the number of cells per second) to be converted to a value in units of cell transfer cycles.

Specifically, when the transfer rate of a transmission path is, for example, 622.08 Mbps, the delay variation tolerance value variation, represented in units of time [sec], must be previously multiplied by a value calculated by $622.08/(53\times 8) \approx 1.46717 \times 10^6$ [cells/sec]. This is a value derived on the assumption that the amount of data per cell is given by $53\times 8$ bps.

Effect of Fourth Embodiment

As described above, the fourth embodiment not only produces similar effects to those of the third embodiment but also provides for a monitoring operation reflecting a delay variation tolerance value.

In addition, even if the tolerance is increased by a delay variation allowable amount allowed in one monitoring cycle, it is possible to reflect to the next cycle the degree of influence actually exerted by the delay variation tolerance portion, thereby making it possible to simultaneously monitor the throughput over a plurality of cycles by detection of violation in each monitoring cycle.

Fifth Embodiment

As mentioned above, the fifth embodiment, which enables the monitoring operation implemented by the second embodiment to be applicable even when a large number of connections are simultaneously monitored, aims at improving both accuracy and efficiency even when a band to be monitored extends over a wide range.

Configuration of Fifth Embodiment

Figure 14:
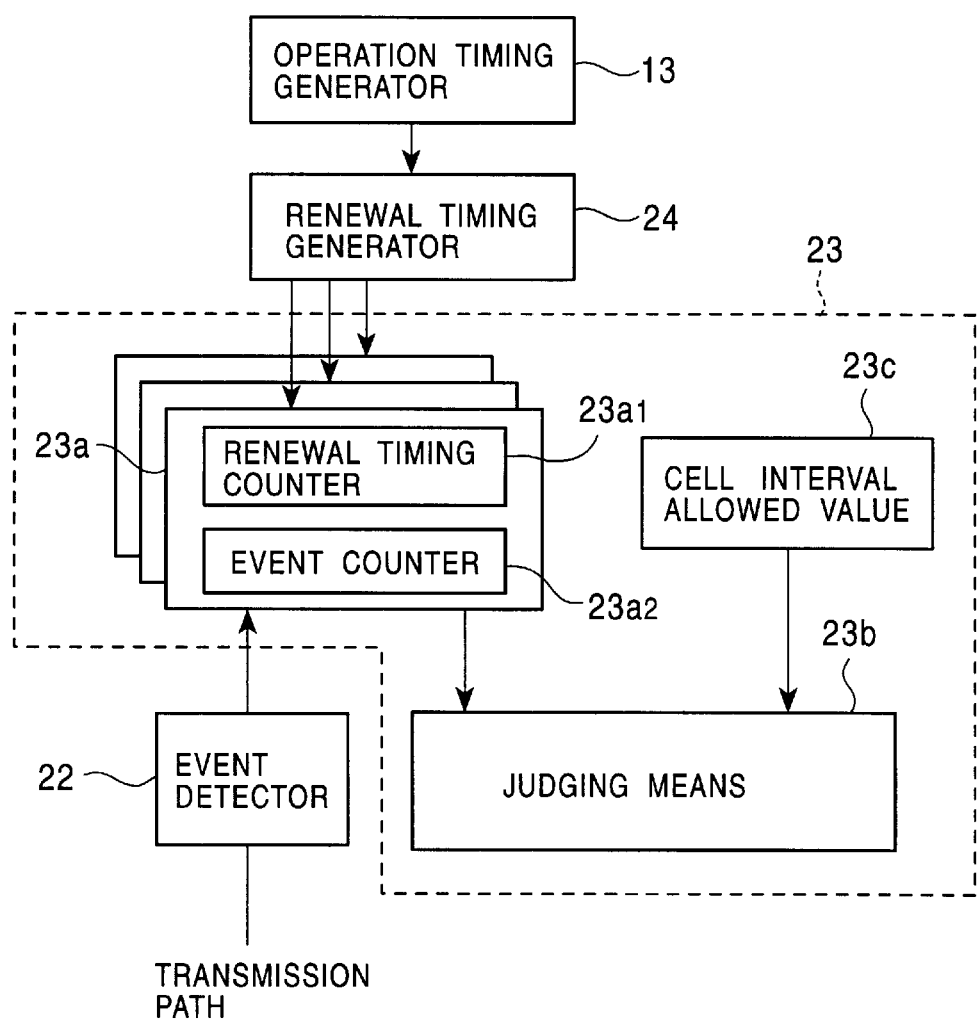
FIG. 14 is a block diagram illustrating the configuration of a cell rate monitoring apparatus according to a fifth embodiment.

FIG. 14 is a block diagram showing the configuration of a cell rate monitoring apparatus according to the fifth embodiment.

The cell rate monitoring apparatus 21 comprises an event detecting means 22, a monitoring information managing means 23, a renewal timing generator 24 and an operation timing generating means 3 which supplies a timing signal to the renewal timing generator 24.

Figure 15:
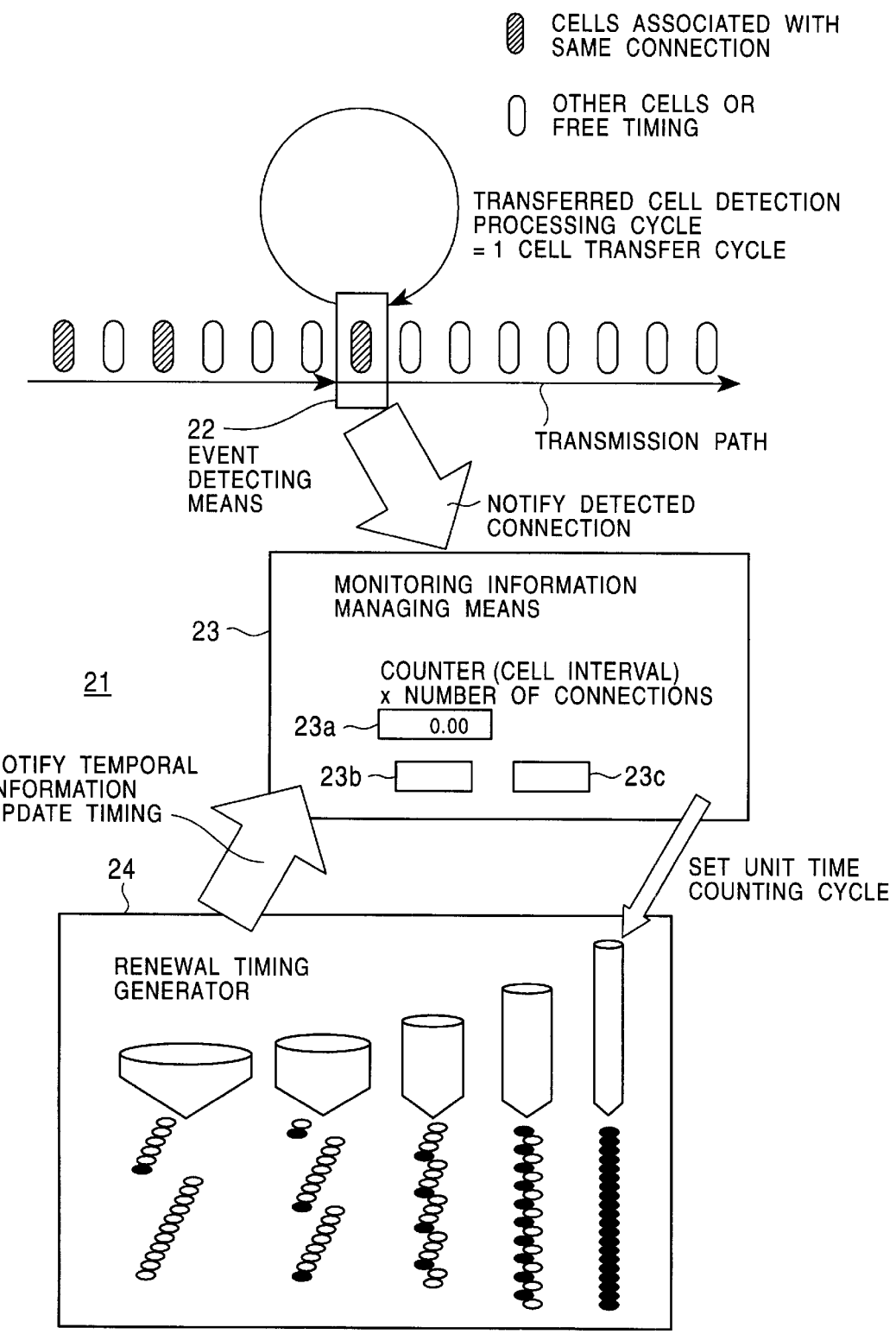
FIG. 15 is a diagram schematically illustrating the cell rate monitoring apparatus shown in FIG. 14.

FIG. 15 is a diagram schematically showing the cell rate monitoring apparatus shown in FIG. 14.

In this embodiment, the event detecting means 22 detects the cell passing through the transmission path in every one cell cycle. The event detecting means 22 also detects the connection corresponding to the detected cell. The event detecting means 22 supplies data of the detected connection to the monitoring information managing means 23 as a detected connection notification.

The monitoring information managing means comprises a plurality of cell interval counters 23a whose number corresponds to the number of connections being monitored, a processing device 23b, and a memory 23c.

Each of the cell interval counters 23a is constituted by a renewal timing selector 23a1 and an event counter 23a2. The event counter 23a2 is reset at intervals of a plurality of cell transfer cycles, and operative to measure a cell interval from a time when a cell passed at the monitored connection to a time of the arrival of a next cell. The renewal timing selector 23a1 functions a a selection switch to transmit a renewal timing notification given by the renewal timing generating means to a event counter 23a2 to which the renewal timing notification is designated.

In this embodiment, the measuring values which the event counter 23a2 can detect are determined to be several times smaller than the corresponding values in the second embodiment.

It should be noted that a countable range of the cell interval counter 23a also supports digits of decimal fraction, in a manner similar to the second embodiment, so that comparison, addition and subtraction can be performed on a value including a decimal fraction.

The processing device 23b, which is a means for managing processing operations in accordance with a control program, determines whether or not a cell transfer rate for each monitored connection is proper based on a count value of a counter corresponding to each connection. Also, the processing device 23b sets for each corresponding connection a unit time counting cycle (unit) in accordance with a cell rate (band) required to each connection, and sets the unit time counting cycles in the renewal timing generator 24.

The unit time renewal timing generator 24 is a means for managing update timing for the counters corresponding to respective connections separately for each of several segmented bands, and for notifying the monitoring information managing means 23 of the update timing as temporal information update timing notification.

Figure 16:
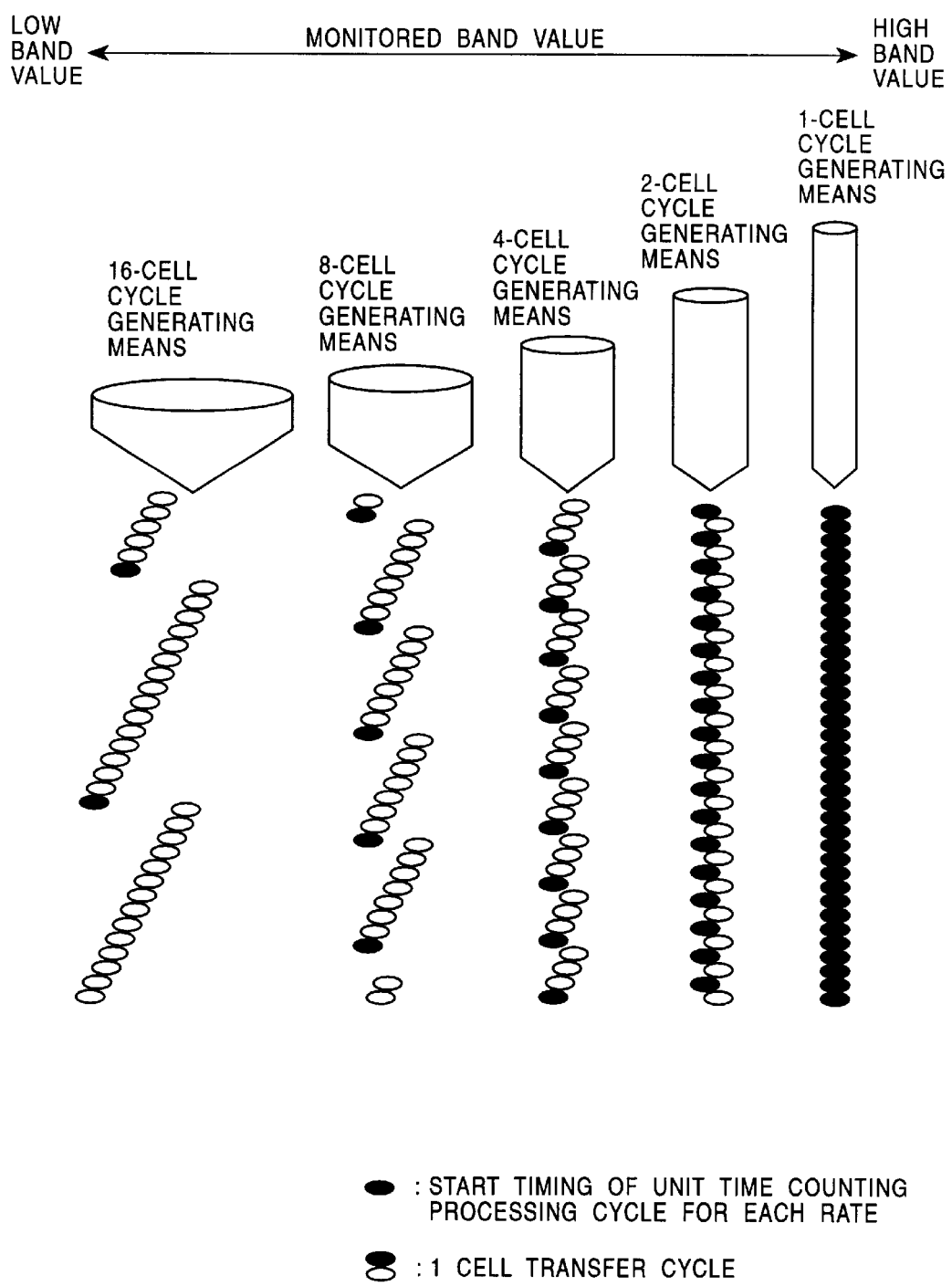
FIG. 16 a diagram showing a conceptual configuration of a unit time counting means.

FIG. 16 illustrates a conceptual configuration of the renewal timing generator 24. Specifically, FIG. 16 represents an example in which unit values supported by the renewal timing generator 24 are five: "16," "8," "4," "2," "1." In this case, the renewal timing generator 24 is composed of five cycle generating means (i.e., a 16-cell cycle generating means, an 8-cell cycle generating means, a 4-cell cycle generating means, a 2-cell cycle generating means, and a 1-cell cycle generating means).

As can be seen from the foregoing, the cell rate monitoring apparatus 21 according to the fifth embodiment allocates a cycle generating means to a plurality of connections having the same unit value, instead of corresponding a cycle generating means to each connection, to improve the efficiency of its processing.

Stated another way, a total of 31 connections can be managed by managing five update timings at most. Moreover, for handling a low band, a required accuracy can be maintained even if the update timing is made larger in inverse proportion to the size of the band, so that the multiplexing provides significant merits.

Operation of Fifth Embodiment

Next, description will be given below on a cell rate monitoring operation performed by the cell rate monitoring apparatus 21 having the configuration as described above.

When a band of a transmission path is entirely allocated to a single connection, the update timing (unit) required for rate monitoring must be updated every cell transfer cycle, in which case the cell rate monitoring apparatus 21 of the fifth embodiment performs an operation similar to that of the second embodiment.

However, for a connection allocated a relatively small band as compared with the entire band of a transmission path, the cell rate monitoring apparatus 21 of the fifth embodiment does perform an operation similar to that of the second embodiment after the detection of transferred cell, in which case, however, a different processing procedure is required for updating temporal information (i.e., for updating the cell interval counter 23a).

In the following, a processing operation unique to the fifth embodiment will be described in detail with reference to FIG. 17. For convenience, FIG. 17 illustrates an example in which the delay variation tolerance value variation is taken into account, as has been described with regard to the second embodiment.

(a) Initial Reset

Figure 17:
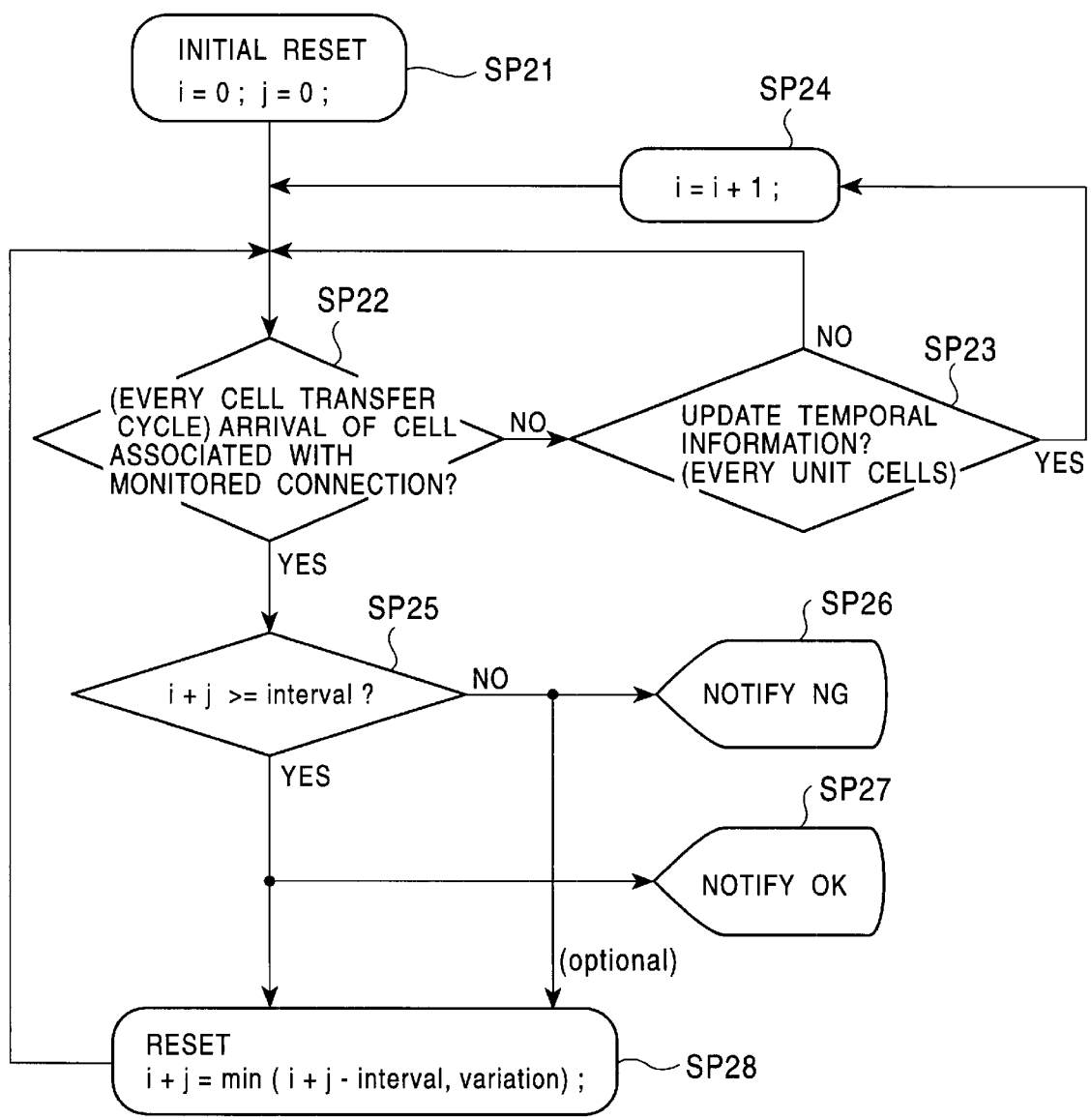
FIG. 17 is a flow chart illustrating a processing operation of the cell rate monitoring apparatus according to the fifth embodiment.

First, at initial reset, the processing device 23b in the cell rate monitoring apparatus 23 initially sets (resets) both an integer number i and a decimal fraction j of the cell interval counter 23a to "0" as shown in FIG. 17 (step SP21).

Alternatively, they may be initially set to an allowed value interval (a value for determining a minimum cell interval allowed for each connection), later described.

In this event, the processing device 23b also determines the value of a unit time counting cycle unit inherent to each connection in accordance with the size of a band allowed to each connection, and sets the determined values in the renewal timing generator 24.

(b) Processing for Determining Presence/Absence of Arrival of Monitored Cell

Next, the processing device 23b determines, each time a cell transfer cycle has elapsed, whether a cell that has arrived at that time is a cell associated with a monitored connection (step SP22).

If the processing device 23b determines that the incoming cell is not a cell associated with the monitored connection, the processing device 23b further determines whether or not the current timing is timing at which temporal information is updated (step SP23). If the processing device 23b has not been notified of the temporal information update timing from the renewal timing generator 24, the processing device 23b returns to the processing at step SP22, without updating the cell interval counter 22a, to wait for the next cell transfer cycle to come. On the other hand, as a result of the determination processing at step SP23, if the processing device 23b has been notified from the renewal timing generator 24 that the temporal information update timing has already passed, the processing device 23b increments the count value of the cell interval counter 22a by "1" (i.e., updates the integer number i to i+1) (step SP24), and returns to step SP22.

This processing is repetitively executed until the arrival of a cell associated with a monitored connection is recognized.

(c) Processing for Determining Presence/Absence of Rate Violation

When a cell associated with a monitored connection eventually arrives, the processing device 23b compares the count value of the cell interval counter 23a for measuring a cell interval with the value interval for determining a previously allowed minimum cell interval (this value is different from that used in the second embodiment, as will be later described. Specifically, the value used in the fifth embodiment is divided by the value unit), and determines whether or not the cell rate is observed from the relationship of magnitude between the two values (step SP25).

In the comparison, if the value of the cell interval counter 23a is larger, the processing device 23b determines that the cell interval observes the cell rate, and proceeds to a notification operation therefor (step SP27) and a counter reset operation (step SP28).

On the other hand, if the value of the cell interval counter 23a is smaller, the processing device 23b determines that the cell interval violates the cell rate, and proceeds to a notification operation therefor (step SP26) and the counter reset operation (step SP28). It should be noted that when cell discard is selected upon determining cell rate violation, the processing device 23b does not execute the counter reset operation as shown in FIG. 17.

(d) Counter Reset Operation

The processing device 23b, when proceeding to the counter reset operation (step SP28), compares a real number value (i+j−interval) calculated by subtracting the allowed value interval from the count value of the cell interval counter 23a (i.e., i+j) with a delay variation tolerance value variation (in units of cell transfer cycles) given as a real number value, and resets both the integer number i and the decimal fraction j with the smaller value.

In this way, the amount of delay can be carried over within an allowable range defined by the delay variation tolerance value variation.

Then, after the counter reset operation, the foregoing processing (a)–(d) is repeated to continue the count-up operation for the cell interval counter 23a in a similar manner until the next cell to be monitored is recognized.

Example of Each Set Value

As the allowed value interval used in the fifth embodiment, a value defined by the following equation is used:

$$\text{interval} = P/(R \cdot \text{unit})$$

where P is a general cell rate of cells passing through a transmission path in [cells/sec], and R is a cell rate for a monitored connection in [cells/sec]. The value interval is represented in units of unit cell transfer cycles.

In the foregoing description, the delay variation tolerance value variation is given in units of unit cell transfer cycles. However, if the delay variation tolerance value variation is given in units of time [sect], the value must be previously multiplied by a cell transfer rate (in units of the number of cells per second) and divided by the unit value to be converted to a value in units of unit cell transfer cycles.

Specifically, when the transfer rate of a transmission path is, for example, 622.08 Mbps, the delay variation tolerance value variation represented in units of time [sec] must be previously multiplied by a value calculated by $622.08/(53 \times 8) \approx 1.46717 \times 10^6$ [cells/sec] and further divided by the unit value. This is a value derived on the assumption that the amount of data per cell is given by $53 \times 8$ bps.

Effect of Fifth Embodiment

According to the fifth embodiment as described above, it is possible to monitor a connection which handles a relatively low band with a small update frequency while monitor a connection which handles a relatively high band with a large update frequency, as well as to produce a similar effect to that of the second embodiment (improvement in the monitoring accuracy yet in consideration of a decimal fraction, and consideration of delay variations). Thus, the fifth embodiment can realize a significant advantage in that the monitoring accuracy is maintained at substantially the same level for respective systems sharing a fixed band while a plurality of operations associated with the respective systems can be multiplexed.

Moreover, the processing as described above may be applied even to the case where a value possibly taken as a monitored band is exponentially extensive, thereby making it possible to limit digits required to counters or the like to a certain fixed number and hence realize simplified and faster processing.

Sixth Embodiment

As mentioned above, the sixth embodiment, which enables the monitoring operation implemented by the fourth embodiment to be applicable even when a large number of connections are simultaneously monitored, aims at improving both accuracy and efficiency even when a band to be monitored extends over a wide range. In other words, the sixth embodiment is an application of the fifth embodiment.

Configuration of Sixth Embodiment

Figure 18:
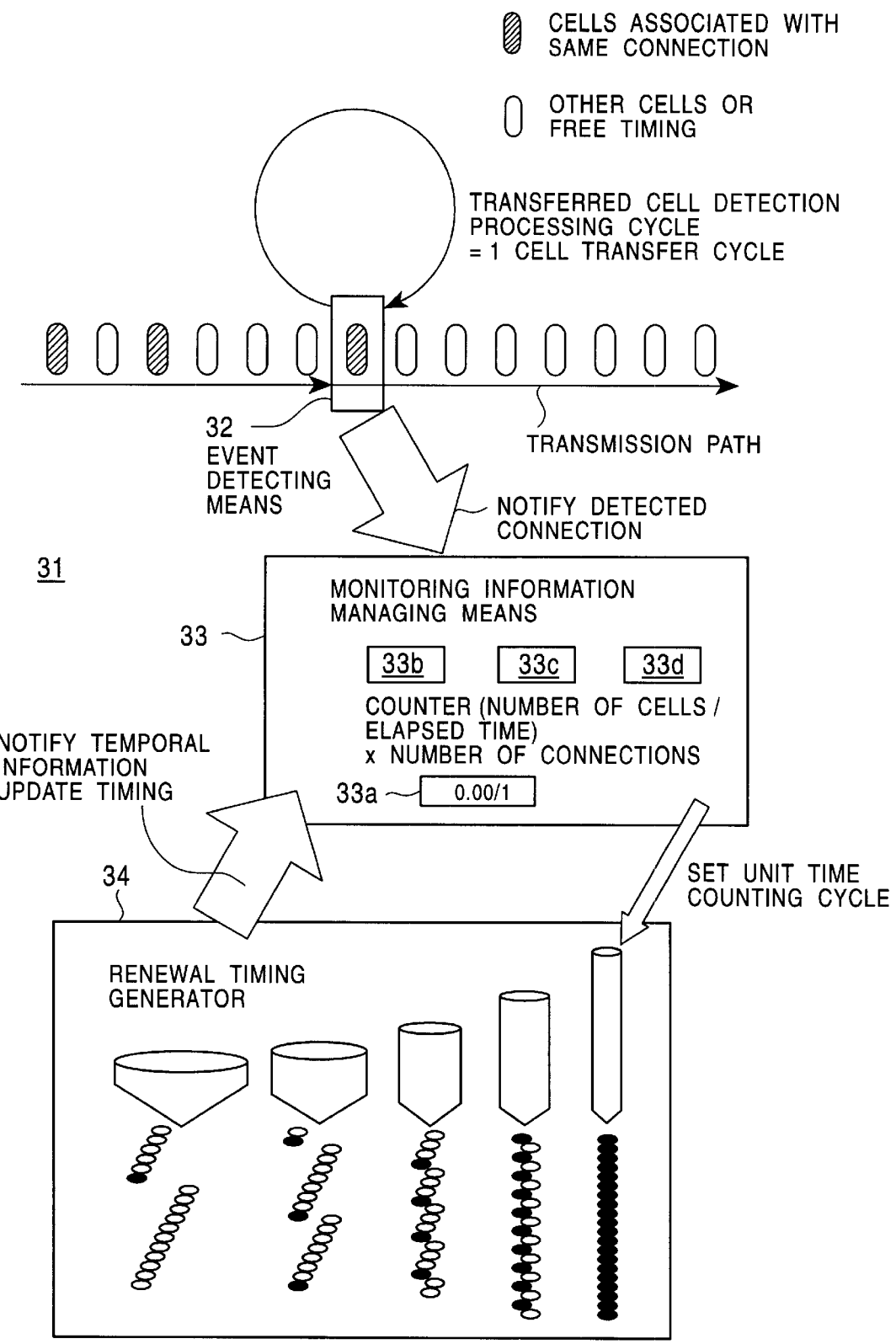
FIG. 18 is a block diagram illustrating the configuration of a cell rate monitoring apparatus according to a sixth embodiment.

FIG. 18 illustrates in a functional block diagram the configuration of a cell rate monitoring apparatus according to sixth embodiment.

The cell rate monitoring apparatus 31 comprises a transferred cell detecting means 32, a monitoring information managing means 33, and a renewal timing generator 34.

The transferred cell detecting means 32, which is a means for detecting a connection corresponding to cells passing through a transmission path every cell transfer cycle, is adapted to provide a detected connection to the monitoring information managing means 33 as a detected connection notification.

The monitoring information managing means 33 is composed of a number of cell number counters 33a corresponding to the number of monitored connections, a processing device 33b, a memory 33c, and an elapsed time counter 33d.

Each of the cell number counter 33a, is a counter for counting the number of cells associated with a monitored connection, which arrive within a predetermined measuring period period of the cell number counter 33a, and is updated once in a plurality of cell transfer cycles. Therefore, a countable value of the cell interval counter 33a is defined to be a small fraction of that used in the fourth embodiment. This is one of differences between the sixth embodiment and the fourth embodiment.

It should be noted that a countable range of the cell interval counter 33a also supports digits of decimal fraction, in a manner similar to the fourth embodiment, so that comparison, addition and subtraction can be performed on a value including a decimal fraction.

The processing device 33b, which is a means for managing processing operations in accordance with a control program, determines whether or not a cell transfer rate for each monitored connection is proper based on a count value of a counter corresponding to each connection. Also, the processing device 33b sets for each corresponding connection a unit time counting cycle (unit) in accordance with a cell rate (band) required to each connection, and sets the unit time counting cycles in the renewal timing generator 34.

The elapsed time counter 33d is a counter updated every cell transfer cycle and is used for measuring the measuring period period (in units of unit cell transfer cycles).

The renewal timing generator 34 is a means for managing update timing for the elapsed time counter 33d corresponding to each connection separately for each of several segmented bands, and for notifying the monitoring information managing means 33 of the update timing as temporal information update timing notification. The conceptual configuration of the renewal timing generator 34 is similar to the conceptual configuration of the renewal timing generator 24 described above in the fifth embodiment.

Operation of Sixth Embodiment

Next, description will be given below on a cell rate monitoring operation performed by the cell rate monitoring apparatus 31 having the configuration as described above.

The sixth embodiment is similar to the fifth embodiment in that temporal information (unit) required for the rate monitoring must be updated every cell transfer cycle when a band of a transmission path is entirely allocated to a single connection, so that the operation in this case is similar to those of the third embodiment and the fourth embodiment.

On the other hand, for a connection allocated a relatively small band as compared with the entire band of a transmission path, the cell rate monitoring apparatus 31 of the sixth embodiment does perform an operation similar to those of the third and fourth embodiments after the lapse of the measuring period period, in which case, however, a different processing procedure is required for updating temporal information (i.e., for updating the elapsed time counter 33d).

In the following, a processing operation unique to the sixth embodiment will be described in detail with reference to FIG. 19. For convenience, FIG. 19 illustrates an example in which the delay variation tolerance value variation is taken into account, as has been described with regard to the fourth embodiment.

(a) Initial Reset

Figure 19:
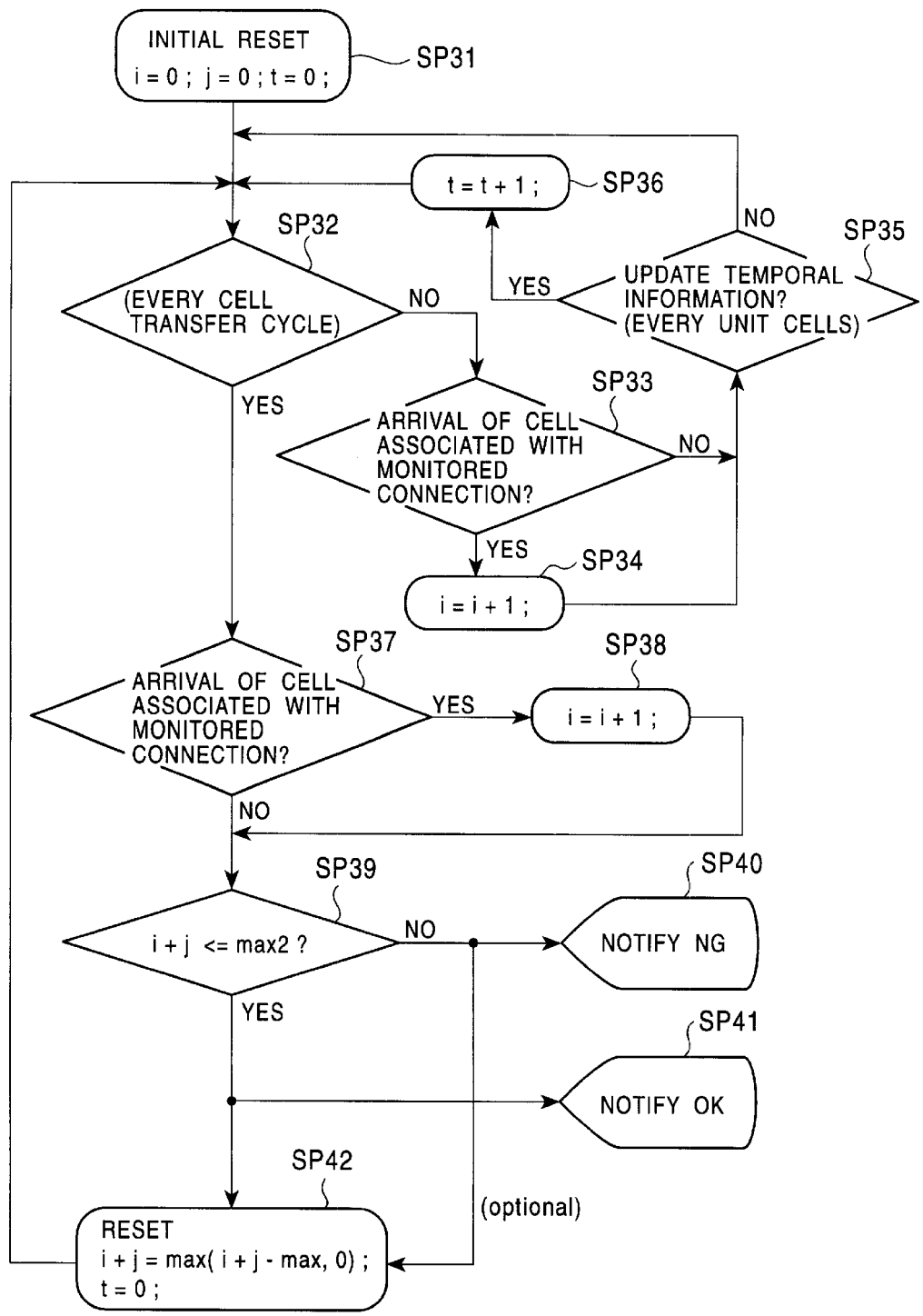
FIG. 19 is a flow chart illustrating a processing operation of the cell rate monitoring apparatus according to the sixth embodiment.

First, at initial reset, the processing device 33b in the cell rate monitoring apparatus 33 resets both an integer number i and a decimal fraction j of the cell number counter 33a for measuring the number of cells to "0" as shown in FIG. 19 (step SP31).

Alternatively, they may be initially set to an allowed value max (a maximum number of cells that can appear within a measuring period allowed for each connection), later described.

In this event, the processing device 33b also determines the value of a unit time counting cycle unit inherent to each connection in accordance with the size of a band allowed to each connection, and sets the determined values in the renewal timing generator 34.

(b) Processing for Determining Lapse of Measuring Period

Next, the processing device 33b compares, each time a cell transfer cycle has elapsed, the count value of the elapsed time counter 33d with the measuring period period (in units of unit cell transfer cycles) to determine whether or not a time period corresponding to the measuring period has elapsed (step SP32).

Then, the following operations in (c) and (d) are repetitively executed while a negative result is returned at step SP32, i.e., until unit cell transfer cycles pass the number of times equal to the value set to period.

(c) Processing for Determining Presence/Absence of Arrival of Monitored Cell

When a negative result is returned as step SP32, the processing device 33b determines every cell transfer cycle whether or not a cell that has arrived at the current timing is a cell associated with a connection monitored by the cell number counter 33a (step SP33).

The processing device 33b instructs the corresponding cell number counter 33a to increment its count value by "1" (step SP34) when it determines that an incoming cell is a cell associated with a monitored connection, and maintains the count value of the cell number counter 33a unchanged from the previous time when it determines that the incoming cell is not a cell associated with the monitored connection.

(d) Processing for Updating Elapsed Time Counter

After completing the foregoing processing (c), the processing device 33b determines whether or not temporal information update timing, for instructing the elapsed time counter 33d corresponding to the cell number counter 33a to update its count value, has been given from the renewal timing generator 34 (step SP35).

Since the temporal information update timing is given once for a plurality of cell transfer cycles when a monitored connection is in a lower band, a negative result is returned for a cell transfer cycle which has not been given the temporal information update timing, causing the processing device 33b to return to the aforementioned processing (a).

On the other hand, with a cell transfer cycle which has been given temporal information update timing, the count value of the elapsed time counter 33d is incremented by "1." In other words, a time count value t is updated to t+1 (step SP36). Then, after updating the time count value t, the processing device 33b returns to the aforementioned processing (a).

(e) Processing for Determining Presence/Absence of Rate Violation

When eventually determining that a predetermined measuring period has elapsed in the processing (a), the processing device 33b further determines whether or not a cell associated with the monitored connection has arrived at this time (step SP37).

Then, the processing device 33b determines whether or not the cell rate is observed for the monitored connection by using the count value of the cell number counter 33a after it has been incremented by "1" if a cell has arrived (step SP38) and otherwise by using the count value of the cell number counter 33a registered up to the previous cell transfer cycle (step SP39).

Here, the processing device 33b compares the count value of the cell number counter 33a with the maximum value max2 which indicates a maximum number of cells allowed within a measuring period for the connection in consideration of delay variations, and performs a cell rate determining operation from the relationship of magnitude between the two values.

If the count value of the cell number counter 33a is smaller, the processing mean 33b determines that the number of cells within the measuring period observes the cell rate, and proceeds to a notification operation therefor (step SP41) and a counter reset operation (step SP42).

On the other hand, if the count value of the cell number counter 33a is larger, the processing device 33b determines that the number of cells within the measuring period has violated the cell rate and is further increasing, and proceeds to a notification operation therefor (step SP40) and the counter reset operation (step SP42). It should be noted that when cell discard is selected upon determining cell rate violation, the processing device 33b does not execute the counter reset operation as shown in FIG. 19.

(f) Counter Reset Operation

The processing device 33b, when proceeding to the counter reset operation (step SP42), compares a real number value (i+j−max) derived by subtracting the allowed value max (without taking into account delay variations) from the count value (i.e., i+j) of the cell number counter 33a with zero, and resets both the integer number i and the decimal fraction j with the larger value.

In this way, a delay amount can be carried over within a range of allowed delay variation amount (max−max2).

In this event, the count value of the elapsed time counter 33d is also reset to "0" at the same time.

Then, after the counter reset operation, the processing device 33b repetitively executes the foregoing processing (b)–(e) to continue the cell number counting operation, until the expiration of the next measuring period is recognized, for counting cells associated with the monitored connection, which have arrived in the meantime.

Example of Each Set Value

For the allowed value max used herein, which does not take into account delay variations, i.e., the maximum number of cells allowed during a measuring period for a moni tored connection, assume that a value defined by the following equation is used:

$$\mathrm{max} = (R \times \mathrm{unit})/P \times \mathrm{period}$$

where P is a general cell rate of cells passing through a transmission path in [cells/sec], and R is a cell rate for a monitored connection in [cells/sec]. The value max is represented in units of the number of cells per period [unit cell transfer cycles].

Also, for the allowed value max2 used herein, which takes into account delay variations, i.e., the maximum number of cells allowed in a state where delay variations are taken into account during a measuring period for a monitored connection, that is, when the delay variation tolerance value variation is given as a value represented in units of cell transfer cycles, assume that a value defined by the following equation is used:

$$max2 = \mathrm{max} \times \frac{\mathrm{period}}{\mathrm{period} - \mathrm{variation}}$$

The value max2 is represented in units of the number of cells per period [unit cell transfer cycles].

It should be noted however that if the delay variation tolerance value variation is given in units of time [sec], the value must be previously multiplied by a cell transfer rate (in the number of cells per second) and divided by the unit value to be converted to a value in units of unit cell transfer cycles.

Specifically, when the transfer rate of a transmission path is, for example, 622.08 Mbps, the delay variation tolerance value variation must be previously multiplied by a value calculated by $622.08/(53 \times 8) \approx 1.46717 \times 10^6$ [cells/sec] and divided by the unit value. This is a value derived on the assumption that the amount of data per cell is given by 53×8 bps.

Effect of Sixth Embodiment

According to the sixth embodiment as described above, it is possible to monitor a connection which handles a relatively low band with a small update frequency while monitor a connection which handles a relatively high band with a large update frequency, as well as to produce a similar effect to that of the fourth embodiment (improvement in the monitoring accuracy yet in consideration of a decimal fraction, and consideration of delay variations). Thus, the sixth embodiment can realize a significant advantage in that the monitoring accuracy is maintained at substantially the same level for respective systems sharing a fixed band while a plurality of operations associated with the respective systems can be multiplexed.

Moreover, the processing as described above may be applied even to the case where a value possibly taken as a monitored band is exponentially extensive, thereby making it possible to limit digits required to counters or the like to a fixed number and hence realize simplified and faster processing.

Seventh Embodiment

As mentioned above, the seventh embodiment applies an approach referred to as a cell interval queue to the management of update timing for temporal information in the fifth embodiment, and is characterized in that it enables the update timing management to adaptively support even an environment where a band required for each connection varies in a burst manner, and that it can monitor a cell transfer rate by introducing a state management flag referred to as a check flag.

Configuration of Seventh Embodiment

Figure 20:
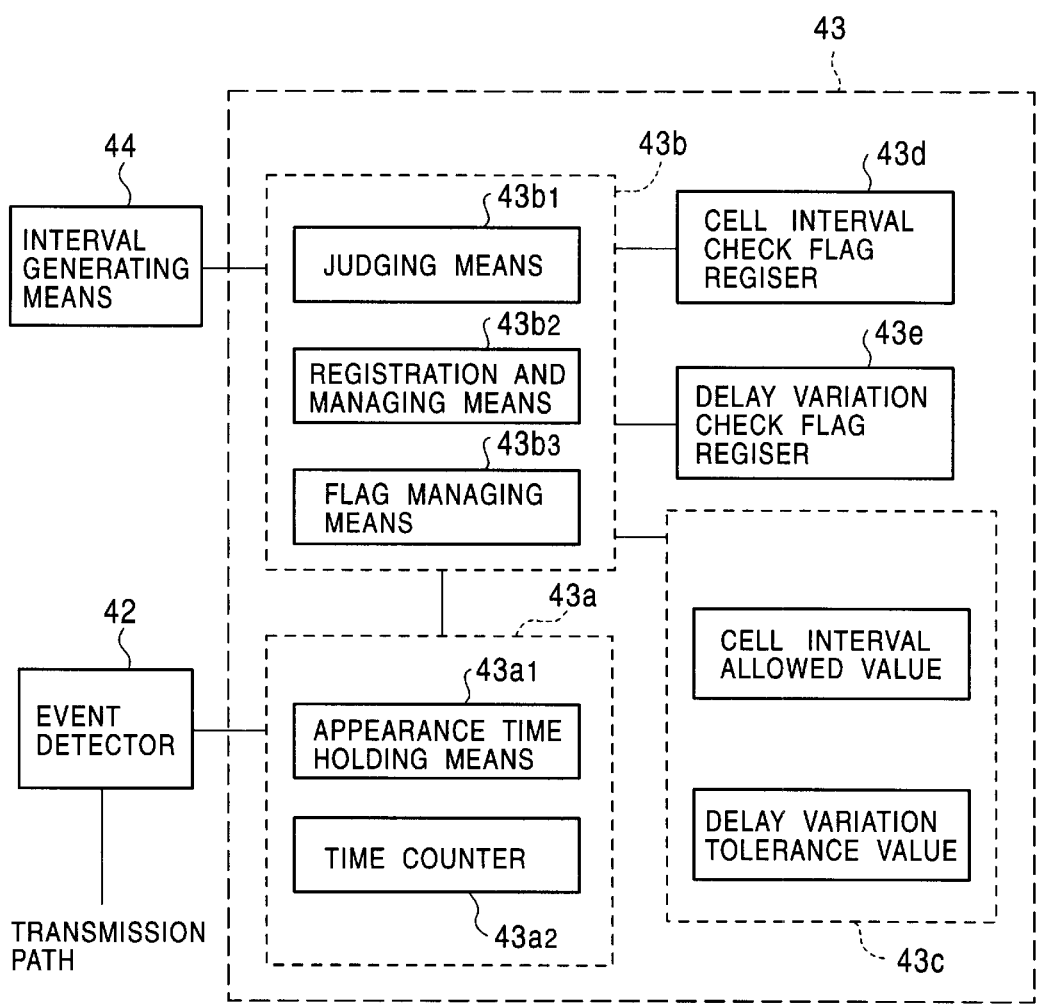
FIG. 20 is a block diagram illustrating the configuration of a cell rate monitoring apparatus according to a seventh embodiment.

FIG. 20 illustrates in a block diagram the configuration of a cell rate monitoring apparatus according to the seventh embodiment.

Figure 21:
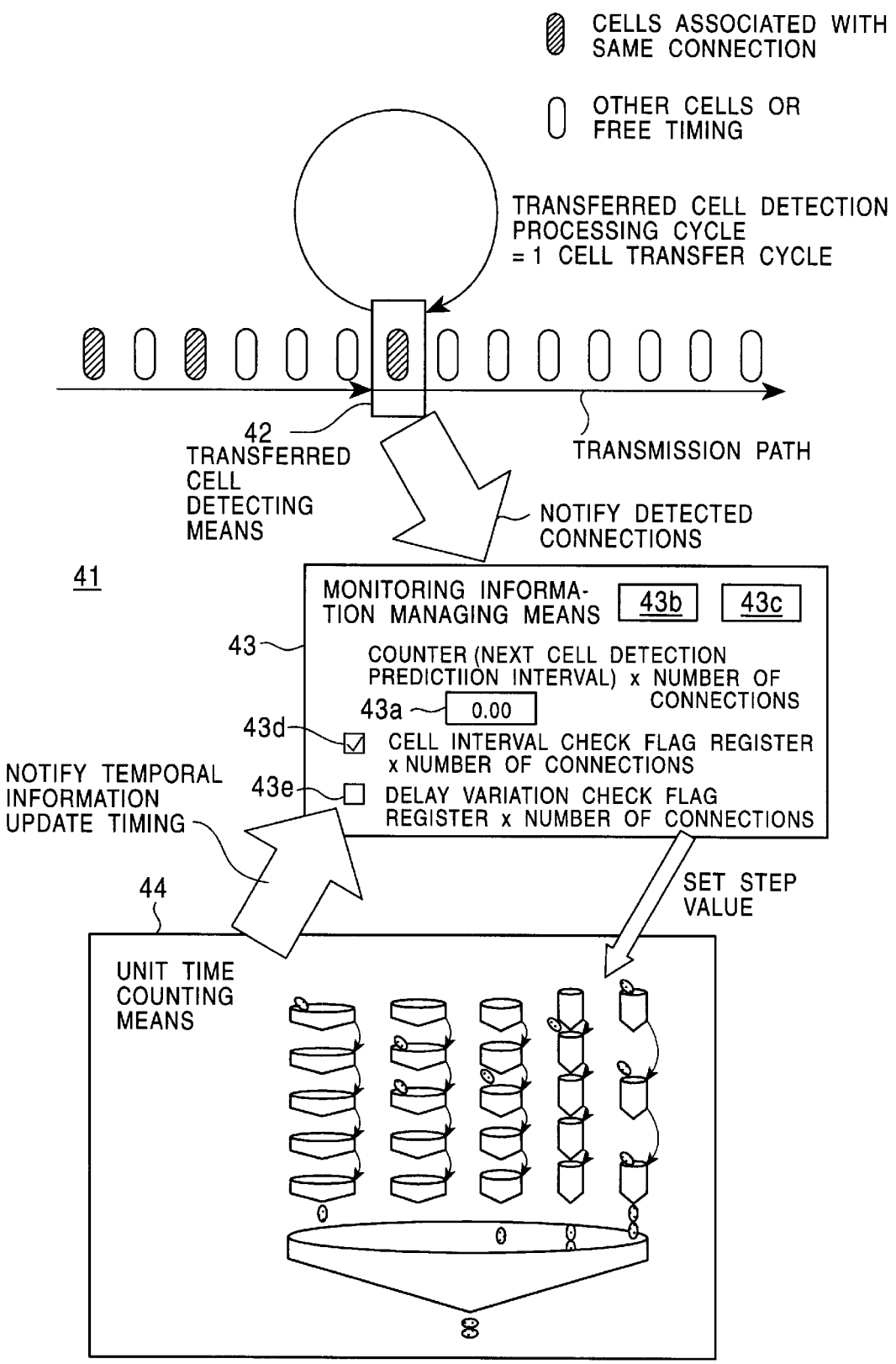
FIG. 21 is a diagram schematically illustrating the cell rate monitoring apparatus shown in FIG. 20.

FIG. 21 is a diagram schematically showing the cell rate monitoring apparatus shown in FIG. 20

The cell rate monitoring apparatus 41 comprises an event detector or transferred cell detecting means 42, a monitoring information managing means 43, and an interval generating means or unit time counting means 44.

The event detector (transferred cell detecting means) 42, which is a means for detecting a connection corresponding to cells passing through a transmission path every cell transfer cycle, is adapted to provide a detected connection to the monitoring information managing means 43 as a detected connection notification.

The monitoring information managing means 43 is composed of next cell detection prediction interval holding counters 43a, a processing device 43b, a memory 43c which holds a cell interval allowed value interval and a delay fluctuation (variation) tolerance value variation, a cell interval check flag register 43d, and a delay variation check flag register 43e.

The next cell detection prediction interval holding counter 43a is constituted by an appearing time holding means 43a1 and a time counter 43a2, and is provided in correspondence to each connection. The counter 43a serves as a means for holding a next-cell detection prediction interval corresponding to each connection. The seventh embodiment differs from the fifth embodiment in this respect. The next-cell detection prediction interval used herein refers to a detection prediction interval defined on the assumption that the next cell associated with each connection is transferred within a allowable range of the cell rate (band) previously set to the associated connection, and is given as a real number value which additionally include digits for a decimal fraction.

The processing device 43b is constituted by a judging means 43b1, a registration and managing means 43b2 and a flag managing means 43b3, and serves not only as a means for managing processing operations in accordance with a control program but also as a means for monitoring whether or not a cell transfer rate is proper using the cell interval check flag and the delay variation check flag. The seventh embodiment differs from the fifth embodiment in this respect. In addition, the processing device 43b operates to set a step value for a queue (fixed for each connection) required for measurements performed thereby from the value of the next-cell detection prediction interval derived for each connection, and to provide the step value to the unit time counting means 44.

The cell interval check flag register 43d is a register for holding the value of a cell interval check flag intchecked. Here, the cell interval check flag is a flag which is raised (for example, set to "1") when a cell interval set for each connection (a cell interval cycle corresponding to the step value) has expired before the next cell arrives, and is maintained in a lower state (for example in "0" state) when a transferred cell is detected on a transmission path before the cell interval expires. Therefore, when a transferred cell is detected while this flag is at the lower state, it is determined that this cell violates a predetermined cell rate.

The delay variation check flag register 43e is a register for holding the value of a delay variation check flag varchecked.

Here, the delay variation check flag is a flag which is raised (for example, set to "1") when the expiration of the next cell interval is detected before the arrival of the next cell when the cell interval check flag has already been raised.

The interval generating means (unit time counting means) 44 is a means for measuring a cell interval for each connection, and for notifying the monitor information managing means 43 that the set cell interval has elapsed as a temporal information update timing notification.

Figure 22:
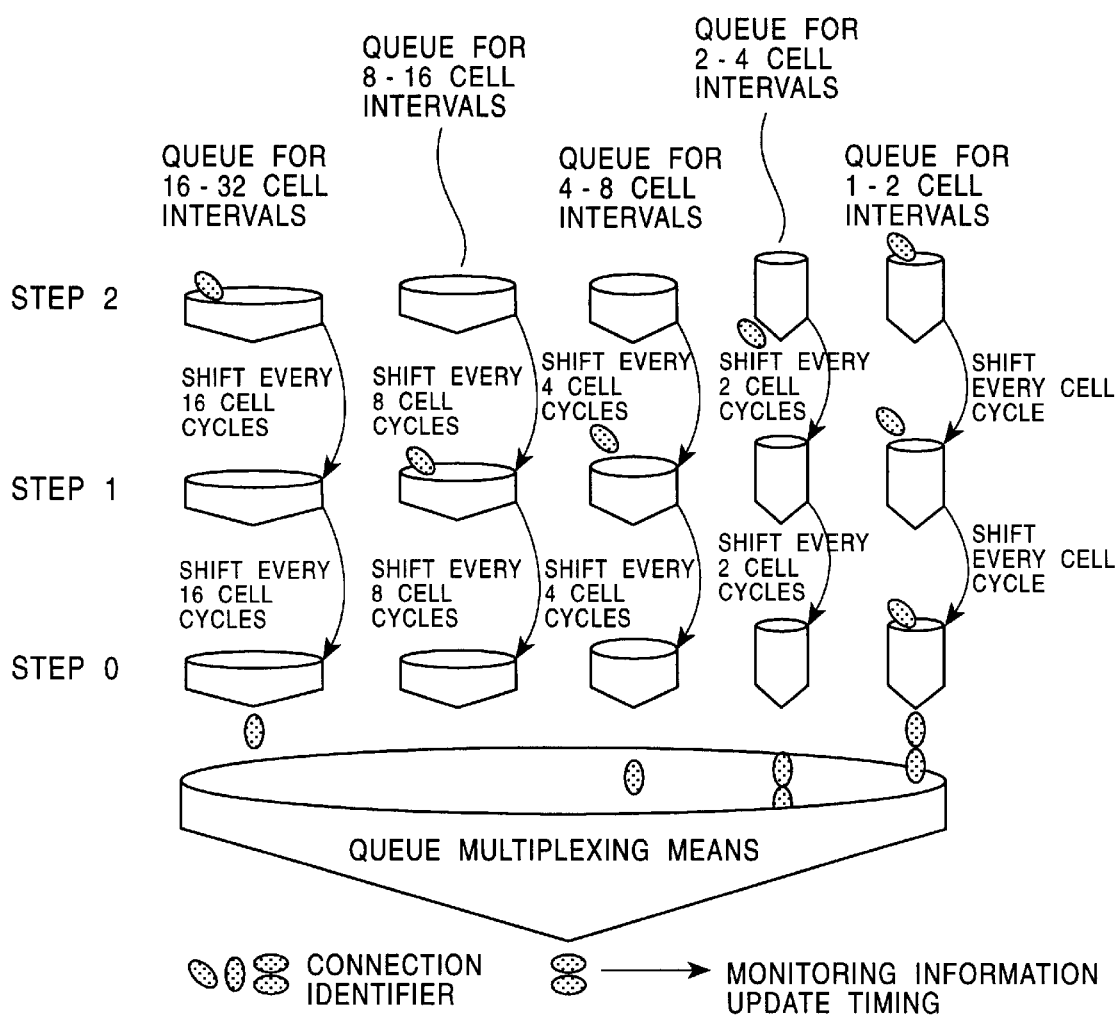
FIG. 22 is a diagram showing a conceptual configuration of a unit time counting means implemented by cell interval queues.

FIG. 22 illustrates a conceptual configuration of the unit time counting means 44. The unit time counting means 44 is provided for monitoring a cell interval allowed in each occasion for each connection using separate queues for different cell intervals having different monitoring unit times unit, and is composed of a plurality of queues corresponding to respective cell intervals (five in FIG. 22).

Each of the plurality of queues is internally partitioned by a plurality of steps for the ease of multiplexing and for supporting a variety of cell intervals, so that information for identifying a certain connection can be inserted into any intermediate step position when a measurement is started or updated for the connection.

For example, the right-most queue illustrated in FIG. 22 is a queue for a cell interval, determined from a cell rate, equal to or more than one and less than two, and has its step determined to be updated every cell cycle (monitoring unit time unit is equal to one). The second queue from the right end illustrated in FIG. 22 is a queue for a cell interval, determined from a cell rate, equal to or more than two and less than four, and has its step determined to be updated every two cell cycles (monitoring unit time unit is equal to two). The subsequent queues are also defined in a similar manner. Stated in a generalized way, an $n^{th}$ queue is a queue for a cell interval, determined from a cell rate, equal to or more than $b^n$ and less than $b^{n+1}$, and has its step determined to be updated every $b^n$ cell cycles.

Identification information for each connection, which has reached step 0 of each queue, is multiplexed at timing indicted by a queue multiplexing means in accordance with a first-in first-out (FIFO) control scheme within step 0, and is notified to the monitoring information managing means 43 as temporal information update timing notification.

In this way, the transferred cell detecting apparatus 41 according to the seventh embodiment is capable of realizing the management of a large number of connections at one time by monitoring the cell rate at time intervals determined for each queue.

Operation of Seventh Embodiment

Next, description will be given on a cell rate monitoring operation performed by the cell rate monitoring apparatus having the configuration as described above.

In the seventh embodiment, there is a fear that the first detected cell may be determined to violate a cell rate in spite that the monitoring processing is started while the state of a monitored connection is unknown. To avoid this inconvenience, in the seventh embodiment, initial setting is performed such that the determination can be started from a state in which delay variations are taken into account. The following description is made with this respect.

(a) Initial Reset

Figure 23:
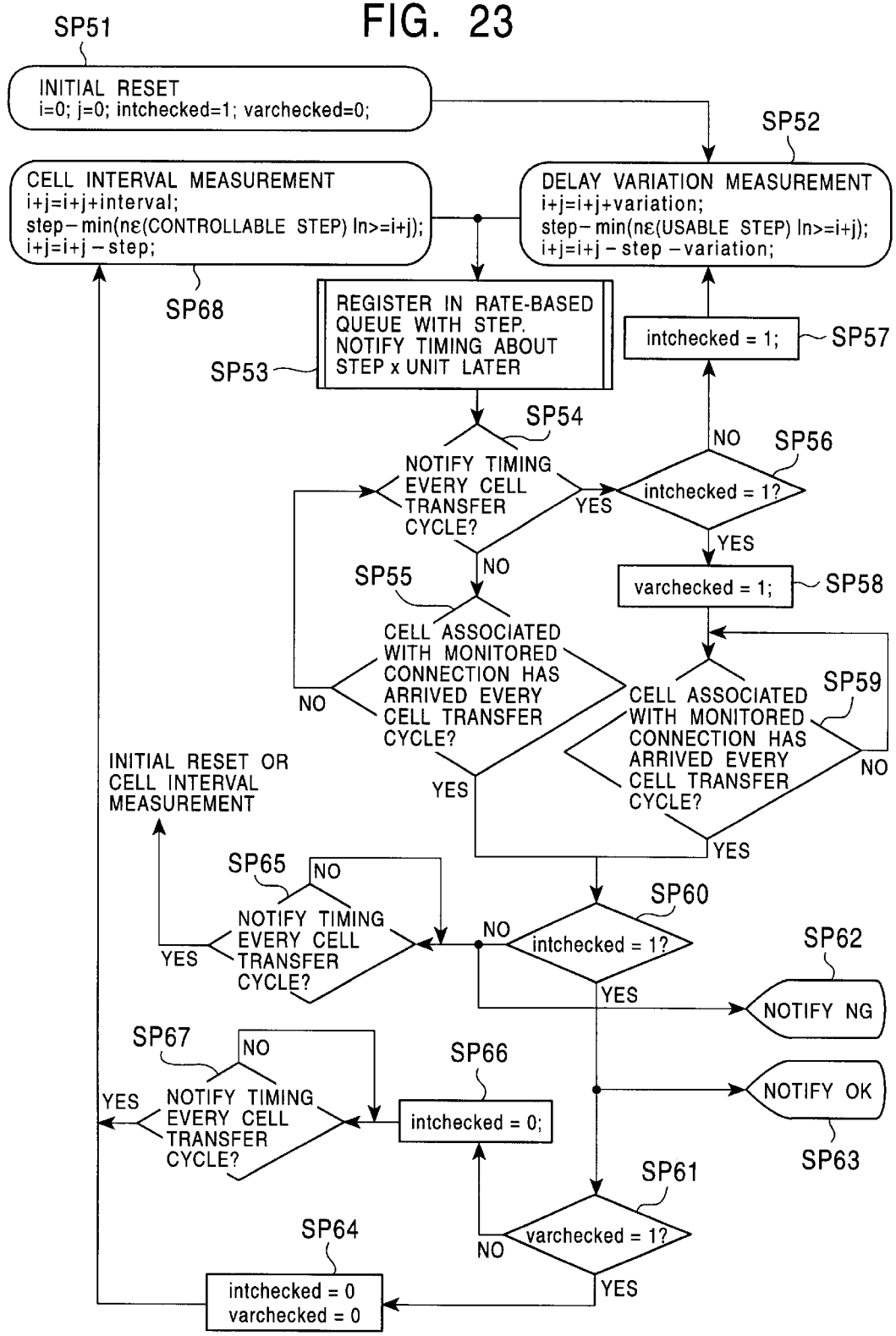
FIG. 23 is a flow chart illustrating a processing operation of the cell rate monitoring apparatus according to the seventh embodiment.

First, at initial reset, the processing device 43b in the monitoring information managing means 43 resets to "0" both an integer number i and a decimal fraction j of the next cell detection prediction interval holding counter 43a for indicating a cell interval which has elapsed by a scheduled detection time of the next cell, sets "1" to the cell interval check flag intchecked, and also sets the delay variation check flag varchecked to "0," as shown in FIG. 23 (step SP51).

(b) Delay variation Measuring Processing at Initial Setting (b-1) Registration of Step Value Next, the processing device 43b adds a delay variation tolerance value variation to a current count value (i+j), and sets the resulting value (=i+j+variation) as a new value (i+j) of the next cell detection prediction interval holding counter 43a (step SP52). In addition, the processing device 43b selects the smallest step value step from those which can be controlled in a queue corresponding to a monitored connection and which are equal to or larger than the new count value, and designates the selected step value as a step value step which is to be registered in the unit time counting means 44.

Once the step value step is selected for use in determining whether or not the arrival of the next cell satisfies a predetermined cell rate, the step value step and the delay variation tolerance value variation are subtracted from the current count value (=i+j+variation) to derive a new count value (i+j=i+j−step−variation=−step) in order to prepare for the processing which should be performed upon arrival of the next cell.

(b-2) Determination Processing

Once the step value step is determined in the manner described above, the processing device 43b provides the step value step derived by the calculation to the unit time counting means 44 for registration (step SP53).

The unit time counting means 44 in turn stores identification information for the connection at a notified step position within a queue corresponding to the connection, and advances the steps every monitoring unit time unit of the queue to manage an arrival prediction time for the next cell.

After completing the registration of the step value step, the processing device 43b determines every cell transfer cycle whether the lapse of a time corresponding to the step value step has been recognized in the unit time counting means 44 based on whether or not the temporal information update timing has been notified (step SP54). If a negative result is returned, the processing device 43b next determines whether a cell associated with the monitored connection has not arrived in the current cell transfer cycle (step SP55).

If even the arrival of a cell cannot be recognized, the processing device 43b again returns to step SP54 to repeat the same determination processing at the time of the next cell transfer cycle. This loop processing is repeated until the notification of the temporal information update timing is recognized before a cell arrives (when an affirmative result is returned at step SP54), or until the arrival of a cell is recognized before the temporal information update timing is notified (when an affirmative result is returned at step SP55).

Assume herein that the temporal information update timing is notified before the arrival of a cell. In this event, the processing device 43b determines whether or not the value of the cell interval check flag intchecked is "1" (step SP56). Since the value has already been set to "1" at the initial rest in this processing, the processing device 43b receives an affirmative result to proceed to step SP58, where the delay variation check flag varchecked is set to "1." Thus, two flags are both set to "1."

Subsequently, the processing device 43b waits for a cell associated with the monitored connection to arrive (step SP59), and enters the processing for determining whether or not the arrival of the cell satisfies a predetermined cell rate at the time an affirmative result is returned (step SP60). In this example, since both the flags have the values set to "1," an affirmative result is returned both at steps SP60 and SP61.

Since this result assumes that the cell interval observes the cell rate, the processing device 43b notifies that the cell interval is normal (step SP63), and sets the values of the two flags to "0" in order to prepare for the next determination processing (step SP64). Subsequently, the processing device 43b proceeds to the next cell interval measuring processing.

(c) Cell Interval Measuring Processing (c-1) Registration of Step Value

The processing device 43b adds a cell interval allowed value interval to a current count value (i+j), and designates the resulting value (=i+j+interval) as a new value (i+j) of the next cell detection prediction interval holding counter 43a (step SP68). In this event, since the current count value (i+j) to be updated takes a negative real number value (step SP52), the updated cell interval exhibits a value smaller than the cell interval allowed value interval, so that the next cell arrival time can be estimated shorter by the difference between the updated cell interval and the cell interval allowed value interval.

In addition, the processing device 43b selects the smallest step value step from those which can be controlled in a queue corresponding to a monitored connection and are equal to or larger than the count value, and designates the selected step value as a step value step which is to be registered in the unit time counting means 44.

The processing device 43b next determines a queue step value step within steps controllable by a queue used by the connection such that the queue step value step is equal to or larger than the value of the cell interval counter. Then, once the processing device 43b determines the step value step for use in determining whether or not the arrival of the next cell satisfies the predetermined cell rate, the processing device 43b subtracts the step value step from the current count value (=i+j+interval) to derive a new count value (i+j=i+j−step) in order to prepare for the processing which should be performed upon arrival of the next cell.

(c-2) Determination Processing

After thus determining the step value step, the processing device 43b next provides the step value step derived by the foregoing calculation to the unit time counting means 44 for registration (step SP53).

Then, the processing device 43b repetitively executes the routine processing comprising step SP54 and step SP55 to determine which of the temporal information update timing and the arrival of a cell is notified earlier, in a manner similar to the aforementioned processing (b-2).

(c-2-1) When N.G.

If the arrival of a cell is notified earlier without exiting the foregoing loop processing even once (i.e., if an affirmative result is returned at step SP55), a negative result is returned in the determination processing at step SP60 since the two flags remains at "0," causing the processing device 43b to proceed to step SP65.

This means that the cell has arrived before a previously allowed time interval, the processing device 43b notifies that the cell interval does not observe the cell rate (step SP62), and enters a waiting state and remains until the cell interval measurement currently under execution is terminated (until an affirmative result is returned at step SP65).

After the foregoing operation, the processing device 43b returns to the initial reset (step SP51) or the registration of the step value for the cell interval measuring processing (step SP68).

(C-2-2) When OK

On the other hand, when the temporal information update timing is notified earlier, the processing device 43b proceeds to the processing for determining whether or not the cell interval check flag intchecked presents the value "1" (step SP56). Here, since delay variation measuring processing has not been performed, the processing device 43b receives a negative result and proceeds to step SP57, where the value of the cell interval check flag intchecked is set to "1."

Then, as has been described with regard to the aforementioned step SP52, the processing device 43b sets a new cell interval in consideration of delay variations, and again determines whether or not a cell associated with the monitored connection has arrived within that time interval (determination at step SP55) or whether the temporal information update timing is notified earlier (step SP54).

If the temporal information update timing is notified earlier even at this stage, the processing device 43b sets the two flags to "1" through the processing in a loop of step SP56 →step SP58→step SP59, and proceeds to the operation for notifying that the cell interval observes the cell rate (step SP63) and the operation for preparing for the monitoring of the next cell (step SP64), in a manner similar to the aforementioned description.

However, if the arrival of a cell is recognized before the time interval newly set in consideration of delay variations, the processing device 43b receives an affirmative result at step SP55, and exits this routine processing. Of course, the cell interval observes the cell rate in this case. However, since the value of the cell interval check flag intchecked is "1" and the value of the delay variation check flag varchecked is "0," the processing device 43b receives a negative result in the determination processing at step SP61 to proceed to the processing at steps SP66 and SP67.

Stated another way, the processing device 43b sets the value of the cell interval check flag intchecked to "0" and enters a waiting state and remains until the cell interval measurement currently under execution is terminated (until an affirmative result is returned at step SP65).

Then, at the time the cell interval measurement is terminated, the processing device 43b returns to the step value registration processing (step SP68) in the cell interval measuring processing.

Example of Each Set Value

For the allowed value interval used herein, a value defined by the following equation is employed:

interval $P/(R \cdot \text{unit})$ where P is a general cell rate of cells passing through a transmission path in [cells/sec], and R is a cell rate for a monitored connection in [cells/sec]. The value interval is represented in units of unit cell transfer cycles.

Also, in the foregoing description, the delay variation tolerance value variation is given in units of unit cell transfer cycles. However, if the delay variation tolerance value variation is given in units of time [sec], the value must be previously multiplied by a cell transfer rate (in units of the number of cells per second) and divided by the unit value to convert to a value in units of unit cell transfer cycles.

Specifically, when the transfer rate of a transmission path is, for example, 622.08 Mbps, the delay variation tolerance value variation represented in units of time [sec] must be previously multiplied by a value calculated by $622.08/(53 \times 8) \approx 1.46717 \times 10^6$ [cells/sec] and further divided by the unit value. This is a value derived on the assumption that the amount of data per cell is given by 53×8 bps.

Effect of Seventh Embodiment

According to the seventh embodiment as described above, it is possible to monitor a connection which handles a relatively low band with a small update frequency while monitor a connection which handles a relatively high band with a large update frequency, as well as to produce a similar effect to that of the fourth embodiment (improvement in the monitoring accuracy yet in consideration of a decimal fraction, and consideration of delay variations). Thus, the seventh embodiment can realize a significant advantage in that the monitoring accuracy is maintained at substantially the same level for respective systems sharing a fixed band while a plurality of operations associated with the respective systems can be multiplexed.

Moreover, the processing as described above may be applied even to the case where a value possibly taken as a monitored band is exponentially extensive, thereby making it possible to limit digits required to counters or the like to a fixed number and hence realize simplified and faster processing.

While more complicated processing is required as compared with the fifth embodiment, the seventh embodiment can reduce the number of times the processing should be performed.

Eighth Embodiment

As mentioned above, the eighth embodiment, which applies an approach referred to as a cell interval queue to a measurement of a cell interval in the seventh embodiment, is characterized by using a counter for checking a cell interval instead of the cell interval check flag and the delay variation check flag used in the seventh embodiment, and introducing a parameter referred to as tolerance for managing allowed fluctuations in transfer timing.

Configuration of Eighth Embodiment

Figure 24:
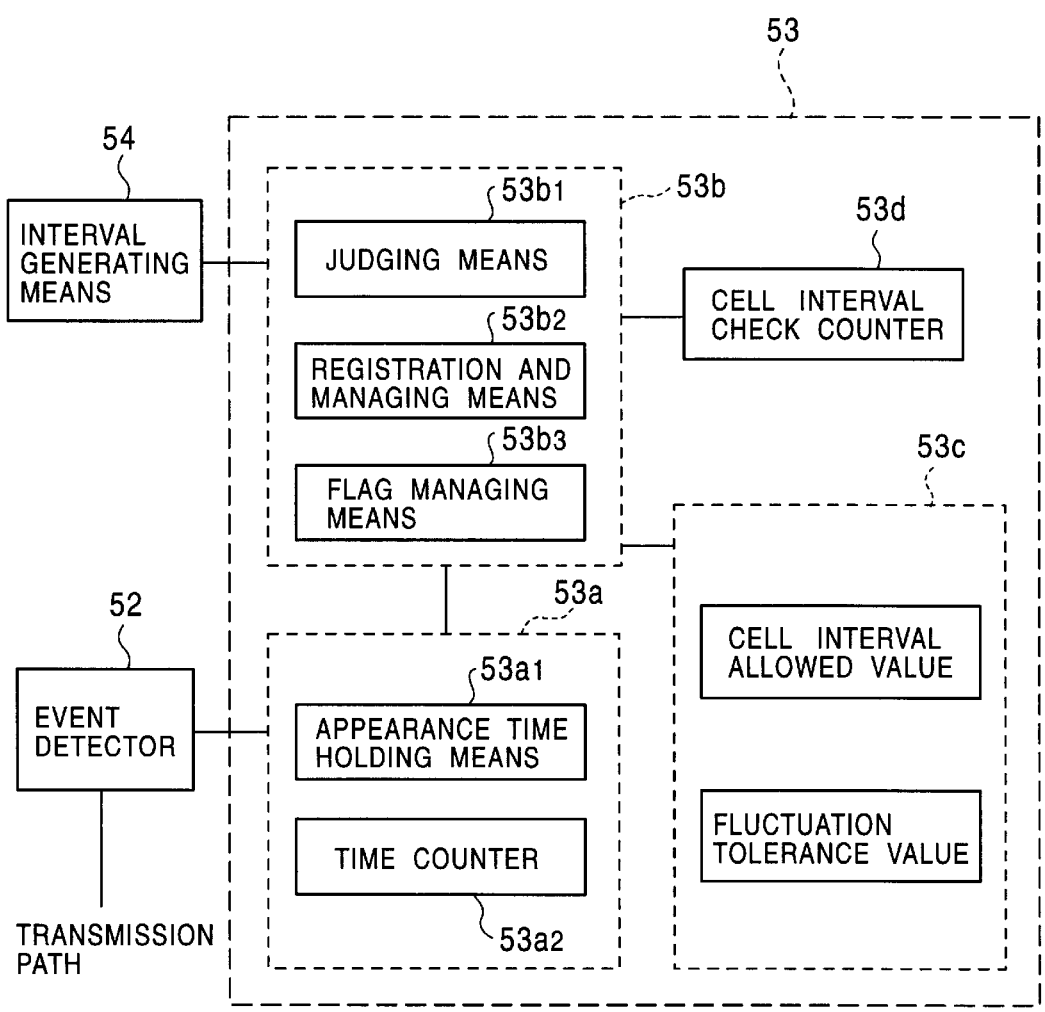
FIG. 24 is a block diagram illustrating the configuration of a cell rate monitoring apparatus according to an eighth embodiment.

FIG. 24 illustrates in a block diagram the configuration of a cell rate monitoring apparatus according to the eighth embodiment.

Figure 25:
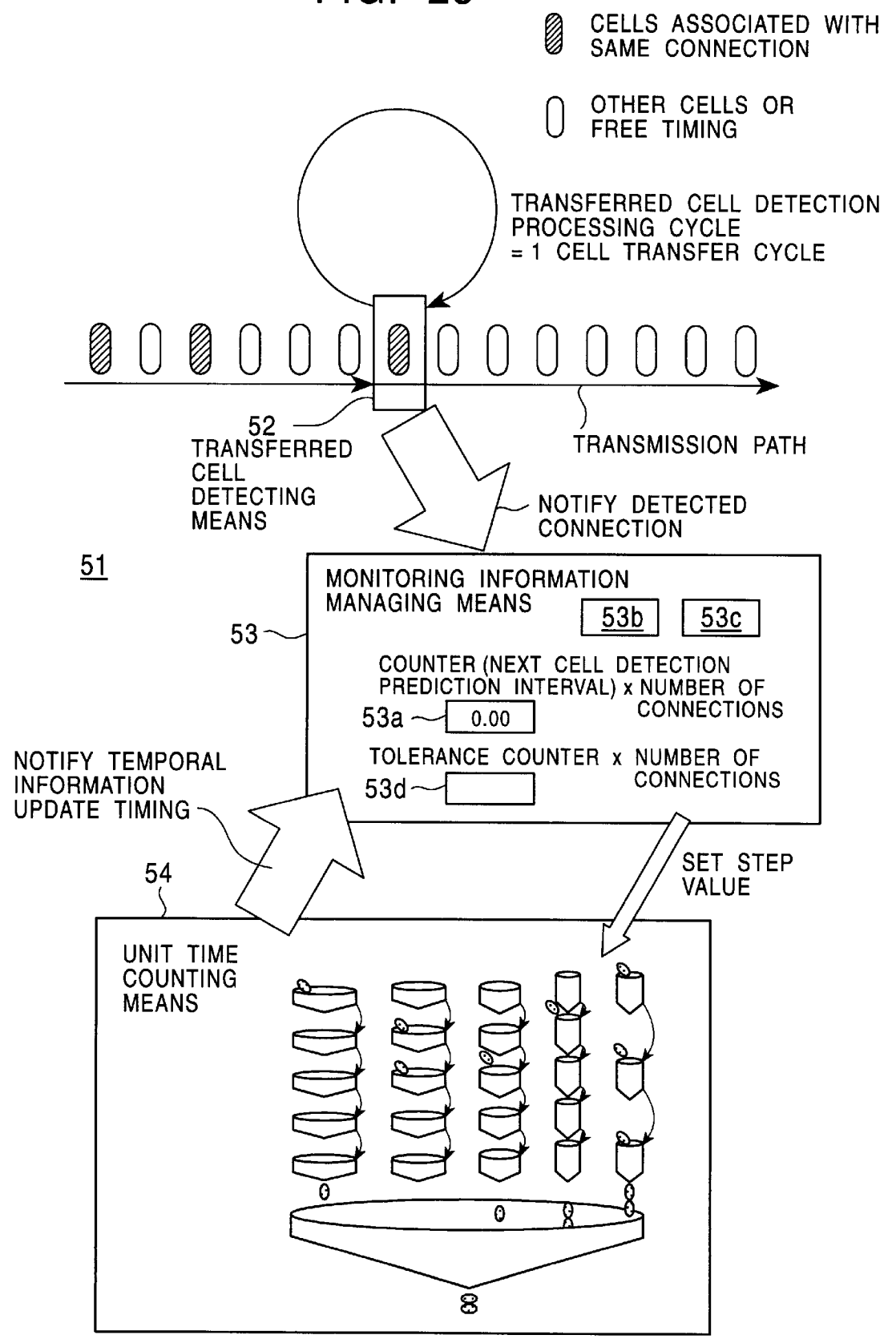
FIG. 25 is a diagram schematically illustrating the cell rate monitoring apparatus according shown in FIG. 24.

FIG. 25 is a diagram schematically showing the cell rate monitoring apparatus shown in FIG. 24.

The cell rate monitoring apparatus 51 comprises an interval generating means for transferred cell detecting means 52, a monitoring information managing means 53, and an interval generating means or a unit time counting means 54.

The transferred cell detecting means (interval generating means) 52, which is a means for detecting a connection corresponding to cells passing through a transmission path every cell transfer cycle, is adapted to provide a detected connection to the monitoring information managing means 53 as a detected connection notification.

The monitoring information managing means 53 is composed of next cell detection prediction interval holding counters 53a, a processing device 53b, a memory 53c which holds a cell interval allowed value interval and a fluctuation tolerance value tolerance, and a cell interval check counter 53d.

The next cell detection prediction interval holding counter 53a is constituted by an appearing time holding means 53a1 and a time counter 53a2, and is a counter corresponding to the next cell detection prediction interval holding counter 43a in the seventh embodiment, provided in correspondence to each connection, and serves as a means for holding a next-cell detection prediction interval corresponding to each connection. The next-cell detection prediction interval used herein refers to a detection prediction interval defined on the assumption that the next cell associated with each connection is transferred within a allowable range of the cell rate (band) previously set to the associated connection, and is given as a real number value which additionally includes digits for a decimal fraction.

The processing device 53b is constituted by a judging means 53b1, a registration and managing means 53b2 and a flag managing means 53b3, and serves not only as a means for managing processing operations in accordance with a control program but also as a means for monitoring whether or not a cell transfer rate is proper using the count value of the cell interval check counter 53d. The eighth embodiment differs from the seventh embodiment in this respect. In addition, the processing device 53b operates to set a step value for a queue (fixed for each connection) required for measurements performed thereby from the value of the next-cell detection prediction interval derived for each connection, and to provide the step value to the unit time counting means 54.

The cell interval check counter 53d is basically different from a counter for use with the delay variation tolerance value variation for determining a fluctuation tolerance value for an individual cell interval, and is a counter provided for managing an average fluctuation over a relatively long period. Its count value intchecked defines a limit to the number of cells which commit violation in the meaning of cell interval.

The unit time counting means 54 is a means for measuring a cell interval for each connection, and for notifying the monitor information managing means 53 that the set cell interval has elapsed as a temporal information update timing notification. The unit time counting means 54 employs an internal configuration similar to that of the seventh embodiment (FIG. 22).

Operation of Eighth Embodiment

Figure 26:
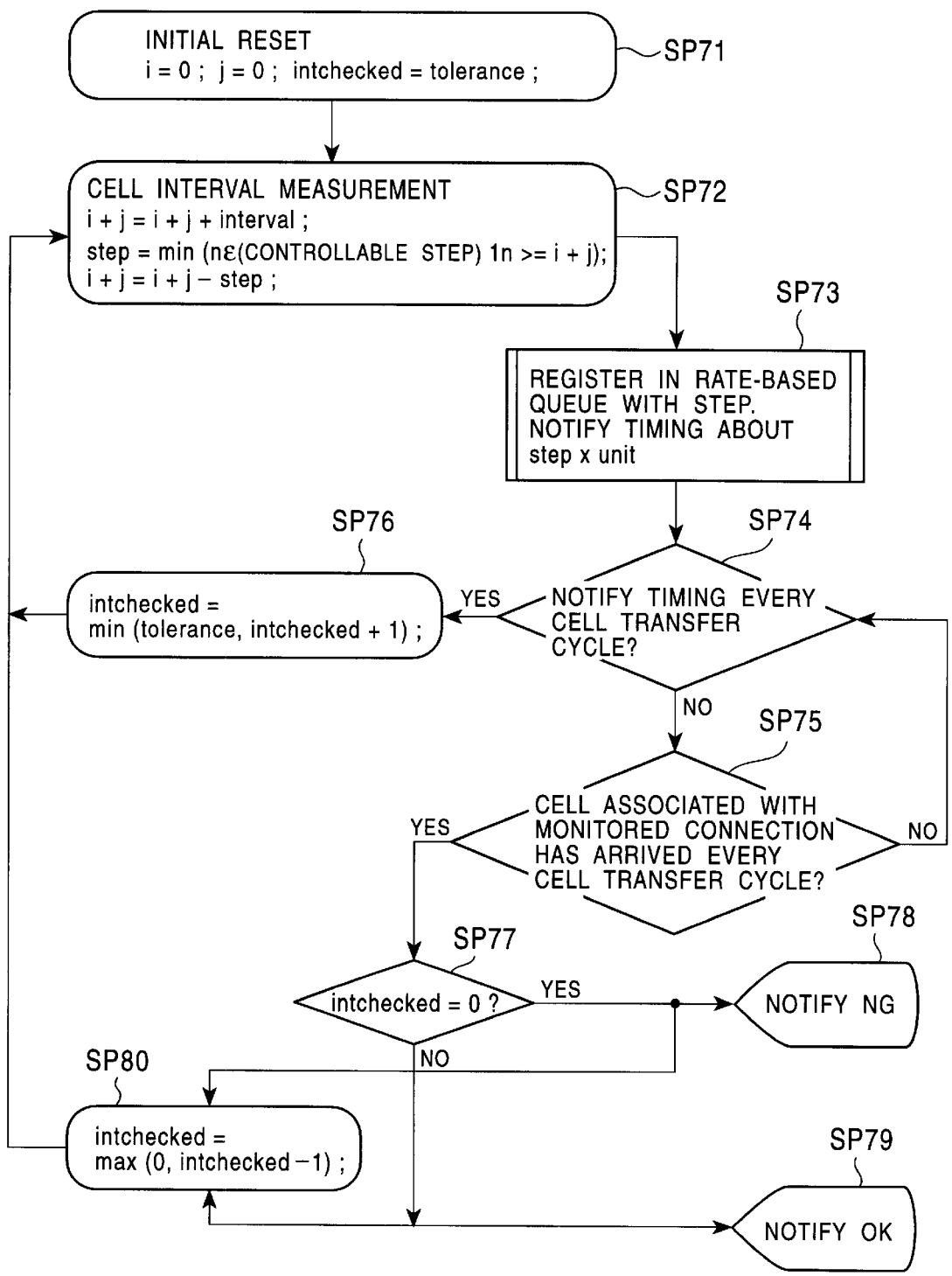
FIG. 26 is a flow chart illustrating a processing operation of the cell rate monitoring apparatus according to the eighth embodiment.
Figure 27:
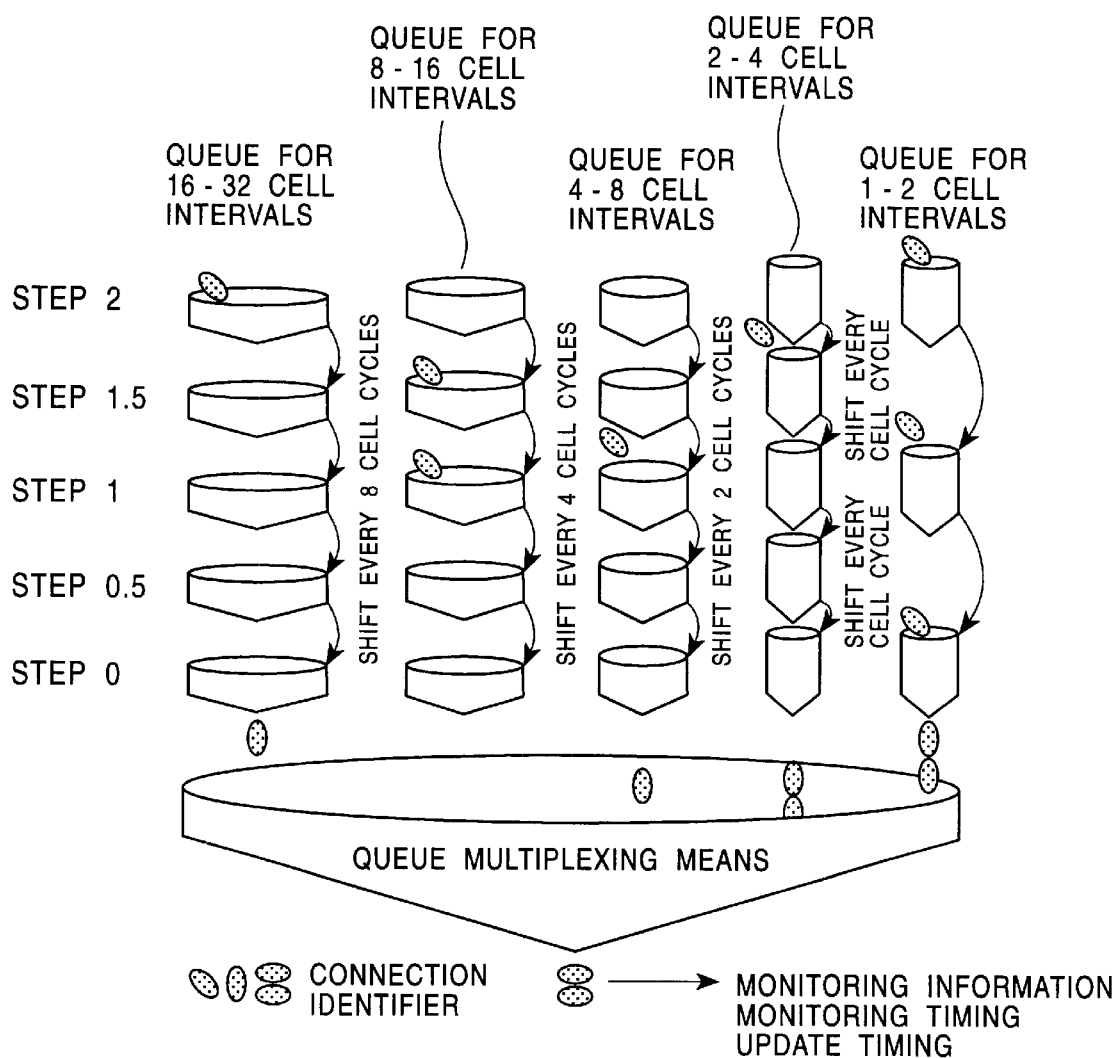
FIG. 27 is a diagram illustrating another exemplary embodiment of a unit time counting means implemented by cell interval queues.

Next, description will be given below on a cell rate monitoring operation performed by the cell rate monitoring apparatus having the configuration as described above.
(a) Initial Reset First, at initial reset, the processing device 53b in the monitoring information managing means 53 resets to "0" both an integer number i and a decimal fraction j of the next-cell detection prediction interval holding counter 53a for indicating a cell interval which has elapsed by a scheduled detection time of the next cell, and sets a count value intchecked of the cell interval check counter 53d to a fluctuation tolerance value tolerance, as shown in FIG. 26 (step SP71).
(b) Cell Interval Measuring Processing
  (b-1) Registration of Step Value Next, the processing device 53b adds a cell interval allowed value interval to a current count value (i+j), and sets the resulting value (=i+j+interval) as a new value of the next cell detection prediction interval holding counter 53a (step SP72).

In addition, the processing device 53b selects the smallest step value step from those which can be controlled in a queue corresponding to a monitored connection and are equal to or larger than the count value, and designates the selected step value as a step value step which is to be registered in the unit time counting means 54.

The processing device 53b next determines a queue step value step within steps controllable by a queue used by the connection such that the queue step value step is equal to or larger than the value of the cell interval counter. Then, once the processing device 53b determines the step value step for use in determining whether or not the arrival of the next cell satisfies the predetermined cell rate, the processing device 53b subtracts the step value step from the current count value (=i+j+interval) to derive a new count value (i+j=i+j−step) in order to prepare for the processing which should be performed upon arrival of the next cell.
  (b-2) Determination Processing Once the step value step is determined in the manner described above, the processing device 53b provides the step value step derived by the calculation to the unit time counting means 54 for registration (step SP73).

The unit time counting means 54 in turn stores identification information for the connection at a notified step position within queues corresponding to the connection, and advances the steps every monitoring unit time unit of the queue to manage an arrival prediction time for the next cell.

After completing the registration of the step value step, the processing device 53b determines every cell transfer cycle whether the lapse of a time corresponding to the step value step has been recognized in the unit time counting means 54 based on whether or not the temporal information update timing has been notified (step SP74). If a negative result is returned, the processing device 53b next determines whether a cell associated with the monitored connection has not arrived in the current cell transfer cycle (step SP75).

If even the arrival of a cell cannot be recognized, the processing device 53b again returns to step SP74 to repeat the same determination processing at the time of the next cell transfer cycle. This loop processing is repeated until the notification of the temporal information update timing is recognized before a cell arrives (when an affirmative result is returned at step SP74), or until the arrival of a cell is recognized before the temporal information update timing is notified (when an affirmative result is returned at step SP75).

Assume herein that the temporal information update timing is notified before the arrival of a cell. In this event, since a cell interval observes a predetermined cell rate, the processing device 53b compares the value derived by adding "1" to the count value intchecked of the cell interval check counter 53d at the current time with the fluctuation tolerance value tolerance, and sets the smaller value to a new count value intchecked. This means that while the count value intchecked may take a variety of values, its maximum value is limited to the fluctuation tolerance value tolerance.

Subsequently, the processing device 53b returns to the aforementioned step SP72 to proceed to the processing for notifying the next timing.

On the other hand, when the arrival of a cell is recognized before the temporal information update timing is notified, the processing device 53b operates as follows.

The processing device 53b first proceeds to step SP77 to enter the processing for determining whether or not the count value intchecked of the cell interval check counter 53d is "0." Here, the count value intchecked is "0" when a cell rate is not observed many times, and an average rate exceeds a range defined by the fluctuation tolerance value tolerance. Normally, the processing device 53b receives a negative result, so that the processing device 53b notifies that the cell interval is normal (step SP79) and proceeds to step SP80. Conversely, if an affirmative result is returned, the processing device 53b notifies that the cell interval is abnormal (step SP78) and proceeds to step SP80.

The processing device 53b, which has proceeded to step SP80, compares a value calculated by subtracting one from the current count value intchecked of the cell interval check counter 53d with "0" and sets the larger one as a new count value, and returns to step SP72 for preparing for the next determination.

Thus, when cells associated with a monitored connection arrive at shorter intervals than a predetermined cell interval due to the generation of burst-like cells, the processing device 53b passes through a path of step SP75→step SP77→step SP80 a larger number of times, so that an update value given to the count value intchecked of the cell interval check counter 53d becomes smaller. If the same tendency continues, the update value will eventually reaches "0," causing the processing device 53b to notify that a cell rate for a monitored connection does not satisfy the condition through the determination processing at step SP77.

Effect of Eighth Embodiment

According to the eighth embodiment as described above, it is possible to improve the monitoring accuracy yet in consideration of a decimal fraction as well as to monitor the rate violation for a monitored connection as its throughput or average rate even for the case not appropriate to the cell interval-based monitoring such as a connection which supports a service that frequently involves burst-like cells.

Also, similarly to the seventh embodiment, since the eighth embodiment utilizes queues for the monitoring, it is possible to reduce the number of times the temporal information is updated when monitoring a connection which handles a relatively low band, and realize multiplexed processing with substantially the same accuracy maintained.

Further, even if a value possibly taken as a monitored band is exponentially extensive, values used in calculations performed by counters or the like can be limited to a fixed magnitude, thus facilitating the processing.

Description of Utilization

In the aforementioned first and third embodiments, while a cell interval is counted for each of monitored connections using a counter supporting a real number value to monitor a cell rate, such monitoring may be performed only on a particular connection which may have been individually selected.

In the aforementioned second and fourth embodiments, while a method of monitoring a connection in consideration of delay variations has been described, this method may be applied either to the case where the monitoring is executed individually for only connections for which a tolerance value has been set for delay variations or to the case where the monitoring is executed for all connections to be monitored.

While the aforementioned fifth embodiment has been described for an embodiment based on the second embodiment (i.e., the delay variation tolerance value variation is taken into account), the fifth embodiment may also be applicable to an embodiment based on the first embodiment or to an apparatus which counts a cell interval using an integer-type counter, referenced as a prior art example, to manage a cell rate.

Similarly, while the aforementioned sixth embodiment has been described for an embodiment based on the fourth embodiment (i.e., the delay variation tolerance value variation is taken into account), the sixth embodiment may also be applicable to an embodiment based on the second embodiment or to an apparatus which counts the number of cells using an integer-type counter, referenced as a prior art example, to manage a cell rate.

In the seventh and eighth embodiments, the monitor unit time unit of each queue is managed based on an interval in accordance with a corresponding cell rate, as illustrated in FIG. 22. For example, the monitor unit time unit is set to "2" for a queue associated with a cell interval equal to or more than two and less than four. Alternatively, as illustrated in FIG. 25, a queue having a step updated at shorter time intervals than an interval in accordance with a corresponding cell rate may be employed.

In this case, a serial number of step may be a value corresponding to an interval which is actually controlled by a real number value. For example, a number "1.7" is designated to a step which is shifted from step 2 after the lapse of unit×0.3 from the previous shift, and again shifted to step 1 after the lapse of unit×0.7, other than a shift of each unit, between step 1 and step 2. In other words, this step is represented as step 1.7.

When steps smaller than the essential monitor unit time unit are additionally inserted as mentioned above, the monitoring unit can be set finer although this requires processing for shifting connections registered in the steps additionally inserted at timings other than the monitor unit time unit and steps previous and subsequent to these steps.

While the fifth to eighth embodiments have been described with regard to a cell rate monitoring apparatus (a so-called polishing apparatus) to which the present invention is applied, the inventions according to these embodiments are applicable not only to a so-called shaping apparatus and other communications apparatus, but also general-purpose processing apparatus for processing, in parallel, a plurality of processing streams in accordance with previously set individual processing rates.

While in the respective embodiments described above, the decimal fraction of the real number counter has been described to have two digits, the number of digits is not limited to this. A further improvement in accuracy can be realized by increasing the number of digits as required. Conversely, it is of course possible to provide a decimal fraction having only one digit.

While in the respective embodiments described above, ATM cells (fixed length packets having 53 bytes) are transmitted on a transmission path, the present invention is not limited to this particular form of transmission. Alternatively, the present invention is applicable to the transmission of any fixed-length packets other than the ATM cells or other packets having arbitrary lengths.

As described above, according to the first aspect of the present invention, a packet interval in a monitored connection can be monitored at a real number level, so that it is possible to reduce a round error of a count value, which has been possibly introduced in the past upon updating the count value, thus realizing more strict monitoring.

Also, according to the second aspect of the present invention, the number of packets within a monitoring period in a monitored connection can be monitored at a real number level, so that it is possible to reduce a round error of a count value, which has been possibly introduced in the past upon updating the count value, thus realizing more strict monitoring.

Further, according to the third aspect of the present invention, not only the number of packets within a monitoring period in a monitored connection can be monitored at a real number level, but also the influence of delay variations can be taken into account, thereby making it possible to monitor a transmission rate over a longer span.

Further, according to the fourth and fifth aspects of the present invention, the frequency of updating an appearance interval counter can be reduced to a frequency determined by an update period of an update timing generating means, so that a reduction in the number of processing steps required for the monitoring of one connection can be realized while maintaining constant a monitoring accuracy in accordance with a monitored processing rate, thereby making it possible to realize multiplexed monitoring processing for a large number of streams.

Further, according to the sixth aspect of the present invention, the determination on the presence or absence of processing rate violation can be made based on next event arrival prediction timing, which has been previously calculated, and moreover the event arrival prediction timing can be set in accordance with a transfer cycle inherent to a corresponding queue means and a registered position of identification information to a step, thereby making it possible to realize a consistent monitoring accuracy and a reduction in processing frequency.

Further, according to the seventh aspect of the present invention, the determination on the presence or absence of processing rate violation can be realized as an average rate over a plurality of monitoring cycles rather than in a monitored cycle basis, so that even if events occur in a burst manner, the presence or absence of violation can be determined from an average rate of the events.

What is claimed is:

1. A processing rate monitoring apparatus, comprising:
an appearance number counter for counting the number of packets appearing within a monitoring period at a real number level for a monitored connection; and
determining means, operable each time the lapse of the monitoring period is notified, to compare a count value of said appearance number counter indicating the number of packets newly counted within a current monitoring period with a delay variation allowed value to determine the presence or absence of a transmission rate violation in the current monitoring period, said delay variation allowed value being derived by adding delay variations to an allowed value for the number of appearing packets, said allowed value being calculated from a transmission rate of said monitored connection, wherein said determining means, upon proceeding to the next monitoring period, compares a first value calculated by subtracting said allowed value, having no influence of delay variations added thereto, from the count value of said appearance number counter with a second value calculated by subtracting a tolerance value having the influence of delay variations added thereto from a delay variation allowed value having no influence of delay variations added thereto, to set the larger one of said first and second values to a count value used in the next monitoring period.

2. A processing rate monitoring apparatus comprising:
event detecting means for notifying a monitored stream corresponding to an event appearing on a transmission path every transfer cycle;
a plurality of appearance interval counters each disposed for counting an event interval for a corresponding monitored stream;
a plurality of update timing generating means each corresponded to one or a plurality of said appearance interval counters for supplying an update timing signal each generated at different periods to the appearance interval counter placed in a corresponding relationship therewith; and
determining means operable, each time a monitored stream corresponding to a detected event is notified thereto from said event detecting means, to access an appearance interval counter corresponding to the monitored stream notified thereto, and to compare a count value of said appearance interval counter indicating a time elapsed from the previous detection to the detection of said event with an allowed value for an appearance interval calculated in consideration of an output period of said update timing and a processing rate of the monitored stream to determine the presence or absence of processing rate violation in a current monitoring cycle.

3. A processing rate monitoring apparatus according to claim 2, wherein said determining means determines the presence or absence of the processing rate violation based on a comparison with the allowed value in consideration of delay variations when determining the presence or absence of the processing rate violation in the current monitoring cycle or when determining the presence or absence of the processing rate violation in the current monitoring period.

4. A processing rate monitoring apparatus according to claim 2, wherein said determining means, upon proceeding to the next monitoring cycle or upon proceeding to the next monitoring period, updates the count value of said appearance interval counter or said appearance number counter in consideration of delay variations.

5. A processing rate monitoring apparatus comprising:
event detecting means for notifying a monitored stream corresponding to an event appearing on a transmission path every transfer cycle;
a plurality of appearance number counters each disposed for counting the number of events appearing within a monitoring period for a corresponding monitored stream;
a plurality of time counters each disposed for measuring a monitoring period for a corresponding monitored stream, each of said time counters responsive to each corresponding update timing signal input thereto to increment a count value;
a plurality of update timing generating means each corresponded to one or a plurality of said time counters for supplying an update timing signal each generated at different periods to a time counter placed in a corresponding relationship therewith; and
determining means, operable each time the lapse of a monitoring period is notified thereto from a corresponding time counter, to compare a count value of an appearance number counter indicating the number of newly counted packets within a current monitoring period with an allowed value for the number of appearing events calculated in consideration of an output period of said update timing and a processing rate of a monitored stream to determine the presence or absence of processing rate violation in the current monitoring period.

6. A processing rate monitoring apparatus according to claim 5, wherein said determining means determines the presence or absence of the processing rate violation based on a comparison with an allowed value in consideration of delay variations when determining the presence or absence of the processing rate violation in the current monitoring cycle or when determining the presence or absence of the processing rate violation in the current monitoring period.

7. A processing rate monitoring apparatus according to claim 5, wherein said determining means, upon proceeding to the next monitoring cycle or upon proceeding to the next monitoring period, updates the count value of said appearance interval counter or said appearance number counter in consideration of delay variations.

8. A processing rate monitoring apparatus comprising:

event detecting means for notifying a monitored stream corresponding to an event appearing on a transmission path every transfer cycle;

a plurality of queue means, each internally partitioned by a plurality of steps, for forwardly feeding one or a plurality of identification information registered in an arbitrary step of said plurality of steps at inherent transfer periods, and for notifying the next event arrival scheduled timing, based on identification information output from a final step of said plurality of steps, for a monitored stream corresponding to said identification information;

a plurality of scheduled timing passage determining flag holding means, each operable when notification of event arrival scheduled timing is detected, to set a corresponding flag and holding the state of said flag at a stage prior to detection of a corresponding event;

determining means, operable each time one transfer cycle has elapsed, to determine whether or not an event of a corresponding monitored stream is detected for each of monitored streams and whether or not the passage of the next event arrival scheduled timing is notified from a corresponding queue, and to determine the presence or absence of processing rate violation of a processing rate in a current monitoring cycle from the state of the flag held in a corresponding scheduled timing passage determining flag holding means when any affirmative determination is recognized.

9. A processing rate monitoring apparatus according to claim 8, wherein said determining means, upon proceeding to the next monitoring cycle, specifies a time required until the arrival of an event scheduled to arrive at the next time in consideration of an appearance interval calculated from a transmission rate of the monitored stream and an extra time excessively estimated in the current monitoring cycle, and registers the identification information of the monitored stream at a step position in a queue corresponding to said monitored stream.

10. A processing rate monitoring apparatus according to claim 8, further comprising a plurality of delay variation determining flag holding means each further set in a state where said scheduled timing passage determining flag is set, each of said delay variation determining flag, operable when notification of event arrival scheduled timing in consideration of delay variations is detected before a corresponding event is detected, to set a corresponding flag and holding the state of the set flag, wherein said determining means, upon determining the presence or absence of processing rate violation in the current monitoring cycle, determines the presence or absence of said processing rate violation based on the state of the flag held in said delay variation determining flag holding means in addition to the state of the flag held in said scheduled timing passage determining flag holding means.

11. A processing rate monitoring apparatus according to claim 8, wherein each of said queue means fixes a transfer period of a step in said queue means to the value of one of corresponding processing rates which requires a minimum transfer period.

12. A processing rate monitoring apparatus according to claim 8, wherein each of said queue means basically fixes a transfer period of a step in said queue means to the value of one of corresponding processing rates which requires a minimum transfer period, and once the transfer cycle is set, transfer can be performed at shorter transfer periods.

13. A processing rate monitoring apparatus comprising:

event detecting means for notifying a monitored stream corresponding to an event appearing on a transmission path every transfer cycle;

a plurality of queue means, each internally partitioned by a plurality of steps, each for forwardly feeding one or a plurality of identification information registered in an arbitrary step of said plurality of steps at inherent transfer periods, and for notifying the next event arrival scheduled timing, based on identification information output from a final step of said plurality of steps, for a monitored stream corresponding to said identification information;

fluctuation tolerance value holding counters each for holding a fluctuation tolerance value for the occurrence of a processing rate violation determining cycle allowed to a corresponding monitored stream;

determining means, operable each time one transfer cycle has elapsed, to determine whether or not an event of a corresponding monitored stream is detected for each of monitored streams and whether or not the passage of the next event arrival scheduled timing is notified from a corresponding queue, and to determine the presence or absence of processing rate violation over a plurality of monitoring cycles by determining whether or not a count value of said fluctuation tolerance value holding counter is larger than a predetermined threshold value when an event is detected before the next event arrival scheduled timing passes.

14. A processing rate monitoring apparatus according to claim 13, wherein said determining means controls the count value of said fluctuation tolerance value holding counter to decrease when an event is detected before the next event arrival scheduled timing passes, and controls the count value of said fluctuation tolerance value holding counter to increase when the passage of the next event arrival scheduled timing is notified before an event is detected.

15. A processing rate monitoring apparatus according to claim 13, wherein each of said queue means fixes a transfer period of a step in said queue means to the value of one of corresponding processing rates which requires a minimum transfer period.

16. A processing rate monitoring apparatus according to claim 13, wherein each of said queue means basically fixes a transfer period of a step in said queue means to the value of one of corresponding processing rates which requires a minimum transfer period, and once the transfer cycle is set, transfer can be performed at shorter transfer periods.

* * * * *